United States Patent
Ogihara et al.

(10) Patent No.: US 10,305,069 B2
(45) Date of Patent: May 28, 2019

(54) PACKAGING MATERIAL FOR POWER STORAGE DEVICE

(71) Applicant: TOPPAN PRINTING CO., LTD., Tokyo (JP)

(72) Inventors: Yu Ogihara, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 95 days.

(21) Appl. No.: 15/666,127

(22) Filed: Aug. 1, 2017

(65) Prior Publication Data

US 2018/0076421 A1    Mar. 15, 2018

Related U.S. Application Data

(63) Continuation of application No. PCT/JP2016/052521, filed on Jan. 28, 2016.

(30) Foreign Application Priority Data

Feb. 4, 2015 (JP) ................................. 2015-020328
Apr. 27, 2015 (JP) ................................. 2015-090263

(51) Int. Cl.
| | |
|---|---|
| *H01M 2/02* | (2006.01) |
| *H01G 11/78* | (2013.01) |
| *B23B 7/12* | (2006.01) |
| *B32B 7/12* | (2006.01) |
| *B32B 15/08* | (2006.01) |
| *B32B 15/20* | (2006.01) |
| *B32B 27/32* | (2006.01) |
| *H01M 10/052* | (2010.01) |

(52) U.S. Cl.
CPC .............. *H01M 2/02* (2013.01); *B32B 7/12* (2013.01); *B32B 15/08* (2013.01); *B32B 15/20* (2013.01); *B32B 27/32* (2013.01); *H01G 11/78* (2013.01); *H01M 2/0275* (2013.01); *H01M 2/0277* (2013.01); *H01M 2/0285* (2013.01); *H01M 2/0287* (2013.01); *H01M 10/052* (2013.01)

(58) Field of Classification Search
None
See application file for complete search history.

(56) References Cited

FOREIGN PATENT DOCUMENTS

| JP | 06-263935 | 9/1994 |
| JP | 2002-245983 | 8/2002 |

(Continued)

OTHER PUBLICATIONS

Extended European Search Report dated Sep. 24, 2018 in corresponding application No. 16746515.2.

(Continued)

*Primary Examiner* — Sarah A. Slifka
(74) *Attorney, Agent, or Firm* — Foley & Lardner LLP

(57) ABSTRACT

A packaging material for a power storage device has a structure in which at least a base material layer, a first adhesive layer, a metal foil layer provided with an anti-corrosion treatment layer on one surface or both surfaces thereof, a second adhesive layer or an adhesive resin layer, and a sealant layer are laminated in this order. In the packaging material, the sealant layer includes a layer formed of a resin composition that contains 60 to 95 mass % propylene-ethylene random copolymer (A), and 5 to 40 mass % polyolefin elastomer (B) including 1-butene as a comonomer and having a melting point of 150° C. or less.

17 Claims, 6 Drawing Sheets

(56) References Cited

FOREIGN PATENT DOCUMENTS

| JP | 2003-272572 | 9/2003 |
| JP | 2003-288866 | 10/2003 |
| JP | 2007-273398 | 10/2007 |
| JP | 2013-025980 | 2/2013 |
| JP | 2013-084608 A | 5/2013 |
| JP | 2014-007130 A | 1/2014 |
| JP | 2014-238978 | 12/2014 |

OTHER PUBLICATIONS

International Search Report issued in International Patent Application No. PCT/US2016/052521 dated May 10, 2016.

INJECT SOLUTION

APPLY VOLTAGE OF 25 V

PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/052521, filed on Jan. 28, 2016, which is based upon and claims the benefit of priority of Japanese Patent Application No. 2015-020328, filed on Feb. 4, 2015, and Japanese Patent Application No. 2015-090263, filed on Apr. 27, 2015, the entireties of which are hereby incorporated by reference.

TECHNICAL FIELD

The present invention relates to a packaging material for a power storage device.

BACKGROUND

Power storage devices that are well known include, for example, secondary batteries, such as lithium ion batteries, nickel hydrogen batteries, and lead batteries, and electrochemical capacitors, such as electric double layer capacitors. Due to downsizing of cellular phones or limited spaces for installation, and other reasons, smaller power storage devices are sought. Thus, lithium ion batteries with high energy density are attracting attention. Metal cans have been used as packaging materials for lithium ion batteries. However, there has been a growing trend to use multi-layer films (e.g. a film having a structure of base material layer/metal foil layer/sealant layer) which are lightweight, have high heat dissipation, and can be produced at low cost.

Lithium ion batteries using the multi-layer film as a packaging material are so configured that the packaging material including an aluminum foil layer as a metal foil layer contains the battery contents to prevent moisture from penetrating into the battery. A lithium ion battery adopting such a configuration is referred to as an aluminum laminated film type lithium ion battery. The battery contents of the lithium ion battery include a positive electrode, a negative electrode, and a separator, and an electrolytic solution or an electrolyte layer. The electrolytic solution contains an aprotic solvent, such as propylene carbonate, ethylene carbonate, dimethyl carbonate, diethyl carbonate, and ethyl methyl carbonate, having osmotic force, and lithium salt as an electrolyte dissolved in the aprotic solvent. The electrolyte layer is formed of a polymer gel impregnated with the electrolytic solution.

As the aluminum laminated film type lithium ion battery, there is known, for example, an embossed lithium ion battery obtained by forming a recess on a part of a packaging material by cold forming, accommodating battery contents in the recess, and folding back the rest of the part of the packaging material to seal the edge portions by heat sealing. The packaging material configuring such a lithium ion battery is required to show stable sealing performance when heat-sealed and to resist degradation of the lamination strength between the aluminum foil layer and the sealant layer due to the electrolytic solution of the battery contents.

In this regard, PTL 1, for example, proposes a packaging material which is provided with a heat sealing layer (sealant layer) including an adhesive polymethylpentene layer.

The energy density of the lithium ion battery can be made higher by making the depth of the recess formed by cold forming deeper. However, when the recess is deeper, micro cracks are prone to occur in the sealant layer due to strain caused during cold forming. Specifically, whitening is likely to occur in the drawn portions, such as shaped surfaces and corners, of the sealant layer. Whitening caused by cold forming reduces insulation properties and thus accelerates degradation of battery performance. Therefore, reducing whitening due to cracks and bending is desired.

In this regard, PTL 2, for example, proposes a packaging material exhibiting stable sealing performance, heat resistance, insulation properties, and formability, and including a heat sealing layer (sealant layer) formed of a polypropylene layer with a high melting point of 150° C. or more, and a propylene-ethylene random copolymer layer.

CITATION LIST

Patent Literature

PTL 1: JP 2002-245983 A
PTL 2: JP 2007-273398 A

SUMMARY OF THE INVENTION

Technical Problem

However, in the conventional packaging material described in PTL 2, although investigation has been made into improvement of sealing performance and insulation properties, and into heat resistance of sealed portions, no investigation has been made into the improvement of degassing and sealing, which is the most extreme of the manufacturing processes of a power storage device. When performing degassing and sealing, heat sealing is performed with the electrolytic solution mentioned above being compressed, and accordingly heat used during sealing is conducted away by the electrolytic solution, more easily causing poor sealing. While improvement in cycle time is sought for in the manufacture of power storage devices, stable sealing performance (degassing and heat sealing strength) is also sought for in degassing and sealing processes, which need the largest quantity of heat for sealing. When low-temperature heat-sealing properties are enhanced too much to improve sealing performance in degassing and sealing processes, there arises a problem that portions other than sealed portions are fused (creating excess sealed portions), the sealed portions become thin (thickness of the sealed portions is decreased), and the internal volume of the power storage device is decreased.

The present invention has been made in light of the problems of the conventional techniques set forth above, and has a first object to provide a packaging material for a power storage device, which improves sealing properties, including degassing and heat sealing strength, associated with the electrolytic solution, while reducing excess sealed portions and the occurrence of whitening due to forming.

In the conventional packaging material described in PTL 1, although investigation has been made on reducing degradation of insulation properties due to the heat and pressure of heat sealing, and on improving sealing performance, no investigation has been made on improving degassing and sealing, which is the most extreme of the manufacturing processes of power storage devices. When performing degassing and sealing, heat sealing is performed with the electrolytic solution mentioned above being compressed, and accordingly heat used during sealing is conducted away by the electrolytic solution, easily causing poor sealing.

While improvement in the cycle time is sought for in the manufacture of power storage devices, stable sealing performance (degassing and heat sealing strength) is also sought for in the degassing and sealing processes which need the largest quantity of heat for sealing.

In recent years, with the trend of reducing thickness and size of electronic devices, such as smartphones and tablet PCs, batteries mounted to the electronic device are required to be thin but to have a high capacity. Under the circumstances, from the viewpoint of increasing the capacity of batteries and reducing cost, battery packaging materials are required to be thin, and the inner layers as insulators are also required to be thin. However, in the conventional packaging materials, a thin inner layer raises a problem of micro cracks easily being caused in the sealant layer due to stress or the like during cold forming, and thus penetration of the electrolytic solution into the cracks occurring, to easily degrade insulation after being formed.

The present invention has been made in light of the problems of the conventional techniques described above, and has a second object to provide a packaging material for a power storage device having good insulation properties after forming and good sealing properties, including degassing and heat sealing strength, in relation to the electrolytic solution.

Solution to Problem

First Aspect

In order to try to achieve the first object set forth above, a first aspect of the present invention provides a packaging material for a power storage device. The packaging material has a structure in which at least a base material layer, a first adhesive layer, a metal foil layer provided with an anticorrosion treatment layer on one surface or both surfaces thereof, a second adhesive layer or an adhesive resin layer, and a sealant layer are laminated in this order. In the packaging material, the sealant layer includes a layer formed of a resin composition that contains 60 to 95 mass % propylene-ethylene random copolymer (A), and 5 to 40 mass % polyolefin elastomer (B) with a melting point of 150° C. or less including 1-butene as a comonomer.

According to the packaging material for a power storage device, with the provision of the sealant layer of the above configuration, the sealing properties, including degassing and heat sealing strength, in relation to the electrolytic solution can be improved, while reducing excess sealed portions and the occurrence of whitening due to forming. Specifically, the propylene-ethylene random copolymer (A) (hereinafter also referred to as "component (A)") has a low crystallizability and good heat-sealing properties. By further formulating the sealant layer using the polyolefin elastomer (B) including 1-butene as a comonomer (hereinafter also referred to as "component (B)") and a melting point of 150° C. or less, sealability with a small quantity of heat can be appropriately improved, and sealing properties, and particularly degassing and heat sealing strength in relation to the electrolytic solution, can be improved. In this case, when the content of the component (B) is less than 5 mass %, improvement of degassing and heat sealing strength in particular becomes insufficient, whereas when the content exceeds 40 mass %, the elastomer component is excessive. This causes degradation in heat resistance as the sealant layer, and also causes excessive improvement of heat-sealing properties at low temperature, resulting in increase of excess sealed portions, further resulting in degradation of processability during treatment. Thus, when the contents of the components (A) and (B) fall within the above ranges, sealing properties, including degassing and heat sealing strength, in relation to the electrolytic solution, is improved, while reducing excess sealed portions. In addition, since the component (B) has 1-butene as a comonomer, a good affinity for the component (A) is obtained, reducing the occurrence of cracks during cold forming and reducing whitening, compared with the case of using an elastomer with no 1-butene.

The packaging material for a power storage device according to the present invention can stabilize the degassing and heat sealing strength, and hence the influence in relation to the quantity of heat during sealing can be reduced, and cycle time of manufacturing power storage devices can be shortened.

In the packaging material for a power storage device, it is preferred that the polyolefin elastomer (B) includes a polyolefin elastomer (B-1) miscible with the propylene-ethylene random copolymer (A), and a polyolefin elastomer (B-2) immiscible with the propylene-ethylene random copolymer (A).

The miscible-type polyolefin elastomer (B-1) can further impart low-temperature sealability, as well as resistance to whitening due to forming, to the packaging material, and can further improve sealing properties, including degassing and heat sealing strength, in relation to the electrolytic solution. The immiscible-type polyolefin elastomer (B-2) can further improve sealing properties, including degassing and heat sealing strength, in relation to the electrolytic solution, by the effect of mitigating stress. By combining the two miscible- and immiscible-type polyolefin elastomers, resistance to whitening due to forming is improved, being well balanced with the improvement of sealing properties in relation to the electrolytic solution.

It is preferred that the miscible-type polyolefin elastomer (B-1) is a propylene-1-butene random copolymer, and the immiscible-type polyolefin elastomer (B-2) is an ethylene-1-butene random copolymer. When the component (A) exhibits a good affinity for a propylene-1-butene random copolymer and an ethylene-1-butene random copolymer, resistance to whitening due to forming, and sealing properties in relation to the electrolytic solution described above can be improved with good balance. For example, in the case of using an immiscible-type elastomer containing no 1-butene, such as an ethylene-propylene elastomer (e.g. an elastomer prepared by finely dispersing olefin rubber dispersed in 70 to 80 mass % polyethylene), a clear sea-island structure is likely to be formed in the sealant layer, and cracks (voids and crazes) are likely to occur in the interfaces of the sea-island structure due to the stress caused during forming, accompanying with whitening. In the case of using an immiscible-type elastomer containing 1-butene, such as an ethylene-1-butene random copolymer, interfacial adhesion in the sea-island structure is improved, and the occurrence of whitening is reduced if stress is applied during forming, for example.

In the above packaging material for a power storage device, it is preferred that the metal foil layer is laminated with the sealant layer via the adhesive resin layer, and the adhesive resin layer contains modified polypropylene as an adhesive resin composition. When the modified polyolefin resin forming the adhesive resin contains modified polypropylene, the polyolefin elastomer (B) including 1-butene as a comonomer obtains an affinity for the modified polyolefin resin forming the adhesive resin. Consequently, the occurrence of cracks between the adhesive resin layer and the sealant layer is further reduced, and hence stronger effects of reducing degradation in sealing strength and reducing the occurrence of whitening can be obtained.

In the packaging material for a power storage device, it is preferred that the metal foil layer is laminated with the sealant layer via the adhesive resin layer, and the adhesive resin layer contains an adhesive resin composition and polypropylene with an atactic structure and/or propylene-α-olefin copolymer with an atactic structure. In this case, whitening due to forming can be mitigated.

It is preferred that the adhesive resin layer further contains propylene-α-olefin copolymer with an isotactic structure. In this case, flexibility for mitigating stress can be imparted to the adhesive resin layer. Thus, heat sealing strength (electrolytic solution resistance in particular) is improved, and degassing and sealing strength is improved, while reducing degradation in electrolytic solution lamination strength. By combining the propylene-α-olefin copolymer with an isotactic structure, with the polypropylene with an atactic structure and/or the propylene-α-olefin copolymer with an atactic structure mentioned above, whitening and bending-resistance insulation is further improved.

In the packaging material for a power storage device, it is preferred that the anti-corrosion treatment layer is provided to at least a sealant layer side surface of the metal foil layer, the anti-corrosion treatment layer containing at least one polymer selected from a group consisting of cationic polymers and anionic polymers; the metal foil layer is laminated with the sealant layer via the second adhesive layer; and the second adhesive layer contains a compound having reactivity with the polymer contained in the anti-corrosion treatment layer in contact with the second adhesive layer. In this case, the polymer in the anti-corrosion treatment layer is strongly bonded to the compound in the second adhesive layer, and hence adhesion between the anti-corrosion treatment layer and the second adhesive layer is improved, and the lamination strength is improved.

In the packaging material for a power storage device, when the anti-corrosion treatment layer contains the polymer, and the second adhesive layer contains the compound having reactivity with the polymer, it is preferred that the second adhesive layer contains an acid-modified polyolefin resin. In this case, adhesion between the second adhesive layer and the anti-corrosion treatment layer is further enhanced, and solvent resistance of the second adhesive layer is further improved.

In the packaging material for a power storage device, it is preferred that the anti-corrosion treatment layer contains a rare earth element oxide, and 1 to 100 parts by mass phosphoric acid or phosphate relative to 100 parts by mass of the rare earth element oxide.

Second Aspect

In order to try to achieve the second object, a second aspect of the present invention provides a packaging material for a power storage device having a structure in which at least a base material layer, a first adhesive layer, a metal foil layer provided with an anti-corrosion treatment layer on one surface or both surfaces thereof, a second adhesive layer or an adhesive resin layer, and a sealant layer are laminated in this order. In the packaging material, the sealant layer includes a layer formed of a resin composition containing 60 to 95 mass % propylene-ethylene random copolymer (A), and total of 5 to 40 mass % elastomer (B') miscible with the propylene-ethylene random copolymer (A) and/or an elastomer (C) immiscible with the propylene-ethylene random copolymer (A); in the resin composition, a content of the immiscible-type elastomer (C) relative to a content of the miscible-type elastomer (B') in terms of a mass ratio is in a range of 0 to 1; and the elastomer miscible-type (B') and the immiscible-type elastomer (C) have a common comonomer component.

The packaging material for a power storage device, which includes the sealant layer of the above configuration, exhibits good insulation properties after forming, and good sealing properties, including degassing and heat sealing strength, in relation to the electrolytic solution. From the viewpoint of safety of a battery, the sealant layer is preferably polypropylene. Among others, the propylene-ethylene random copolymer (A) (hereinafter also referred to as "the component (A)"), which has low crystallizability, has high impact strength and reduces cracks due to forming and stretching, while exhibiting good heat-sealing properties. By formulating the sealant layer using the miscible-type elastomer (B') (hereinafter also referred to as "the component (B')"), crystallizability of the sealant layer is further reduced, change in the volume due to thermal shrinkage is reduced, and the occurrence of cracks in cold forming is reduced. Consequently, the packaging material has good insulation properties after forming. When the layer is further formulated using the immiscible-type elastomer (C)" (also referred to as the component (C)"), sealing properties, including degassing and heat sealing, in relation to the electrolytic solution, are further improved. In this case, if the content of the component (A) is less than 60 mass %, elastomer components, which are the components (B') and (C), are excessive, and the influence of swelling the elastomer components by the electrolytic solution becomes excessively large, resulting in reducing insulation properties after forming. If the content of the component (A) exceeds 95 mass %, improvement of sealing properties in relation to the electrolytic solution will more likely be insufficient. In this regard, when the content of the component (A), (B') and (C) falls within the above ranges, insulation properties after forming, and sealing properties, including degassing and heat sealing strength, in relation to the electrolytic solution, will be excellent. The component (C), which forms a sea-island structure together with the component (A), could be a factor of causing cracks (voids and crazes) in the interface of the sea-island structure. However, since the content of the component (C) relative to that of the component (B') in terms of mass ratio is in the range of 0 to 1, the occurrence of cracks is sufficiently reduced. Since the components (B') and (C) have a common comonomer component, good affinity is obtained of the components (B') and (C) for the component (A), and interfacial adhesion of the sea-island structure to the component (A) is enhanced, and the occurrence of cracks is sufficiently reduced.

The packaging material for a power storage device according to the present invention can stabilize degassing and heat sealing strength, and hence the influence in relation to the quantity of heat during sealing can be prevented, and cycle time in the manufacture of power storage devices can be shortened.

In the above packaging material for a power storage device, it is preferred that the miscible-type elastomer (B') is a propylene-1-butene random copolymer, and the immiscible-type elastomer (C) is an ethylene-1-butene random copolymer. The propylene-1-butene random copolymer has a good affinity for the component (A), and the propylene-1-butene random copolymer has a good affinity for the ethylene-1-butene random copolymer. Thus, affinity in the interface of the sea-island structure is further improved, and the occurrence of cracks in cold forming is further reduced, and insulation properties after forming are further improved. For example, when using an immiscible-type elastomer having no 1-butene, such as an ethylene-propylene elastomer (e.g. prepared by finely dispersing olefin rubber in 70 to 80 mass % polyethylene), a clear sea-island structure is formed in the sealant layer, and cracks are likely to occur in the interfaces of the sea-island structure due to the stress caused during forming. When using an immiscible-type elastomer including 1-butene, such as an ethylene-1-butene random copolymer, the interfacial adhesion of the sea-island structure is improved, the occurrence of cracks is further reduced, and degradation in insulation properties caused by penetration of the electrolytic solution into cracks is further reduced.

In the packaging material for a power storage device, it is preferred that the miscible-type elastomer (B') is a hydrogenated styrene elastomer, and the immiscible-type elastomer (C) is a styrene elastomer. The hydrogenated styrene elastomer has a good affinity for the component (A), and the hydrogenated styrene elastomer has a good affinity for the styrene elastomer. Thus, affinity in the interfaces of the sea-island structure is further improved, the occurrence of cracks in cold forming is further reduced, and insulation properties after forming are further improved. The styrene elastomer has good flexibility and elasticity, and can mitigate stress during forming or the like. Thus, since the occurrence of cracks due to the stress during cold forming is further reduced, insulation properties after forming are further improved.

In the packaging material for a power storage device, it is preferred that the sealant layer is formed as a multi-layer; and among multiple layers forming the sealant layer, a layer using, as a main surface, a surface of the sealant layer on a side opposite to the second adhesive layer or the adhesive resin layer is formed of a resin composition containing the propylene-ethylene random copolymer (A) but containing neither the miscible-type elastomer (B') nor the immiscible-type elastomer (C), or is formed of a resin composition containing the propylene-ethylene random copolymer (A) and the miscible-type elastomer (B') but not containing the immiscible-type elastomer (C). In this case, in the innermost layer of the sealant layer, the occurrence of cracks in cold forming is further reduced, and insulation properties after forming are further improved.

In the packaging material for a power storage device, it is preferred that the metal foil layer is laminated with the sealant layer via the adhesive resin layer; and the adhesive resin layer contains an adhesive resin composition, and polypropylene with an atactic structure and/or a propylene-α-olefin copolymer with an atactic structure. In this case, in the adhesive resin layer, the occurrence of cracks due to stress caused during cold forming, for example, is further reduced, and insulation properties after forming are further improved.

In the packaging material for a power storage device, it is preferred that the metal foil layer is laminated with the sealant layer via the second adhesive layer; and the second adhesive layer contains an acid-modified polyolefin resin, and at least one compound selected from a group consisting of a polyfunctional isocyanate compound, a glycidyl compound, a compound having a carboxyl group, and a compound having an oxazoline group. In this case, adhesion between the second adhesive layer and the sealant layer is improved, peeling between the layers due to stress caused during cold forming, for example, and the occurrence of cracks due to the peeling are reduced, and degradation in insulation properties after forming is better prevented.

In the packaging material for a power storage device, it is preferred that the anti-corrosion treatment layer contains ceric oxide, 1 to 100 parts by mass phosphoric acid or phosphate relative to 100 parts by mass of the ceric oxide, and a cationic polymer. In this case, adhesion between the metal layer and the adhesive resin layer or the second adhesive layer is improved, peeling between the layers due to the stress caused during cold forming, for example, and the occurrence of cracks due to peeling are reduced, and degradation in insulation properties after forming is better prevented.

In the packaging material for a power storage device, it is preferred that the anti-corrosion treatment layer is formed by applying chemical conversion treatment to the metal foil layer, and the anti-corrosion treatment layer contains a cationic polymer. In this case, adhesion between the metal layer and the adhesive resin layer or the second adhesive layer is improved, peeling between the layers due to the stress caused during cold forming, for example, and the occurrence of cracks due to the peeling are reduced, and degradation of insulation properties after forming are better prevented.

Advantageous Effects of the Invention

According to the first aspect of the present invention, there is provided a packaging material for a power storage device, which improves sealing properties, including degassing and heat sealing strength, in relation to the electrolytic solution, while reducing excess sealed portions and the occurrence of whitening due to forming.

According to the second aspect of the present invention, there is provided a packaging material for a power storage device, which has good insulation properties after forming and good sealing properties, including degassing and heat sealing strength, in relation to the electrolytic solution.

DESCRIPTION OF REPRESENTATIVE EMBODIMENTS

Figure 1:
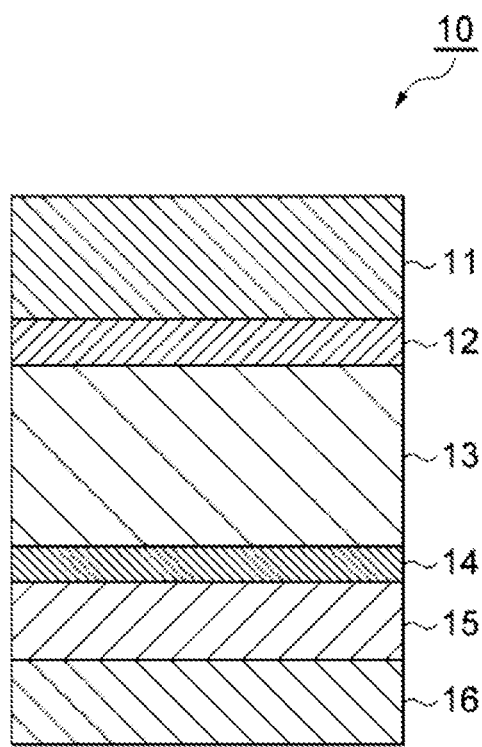
FIG. 1 is a schematic cross-sectional view showing a packaging material for a power storage device according to an embodiment of the present invention.

In the following, preferred embodiments of the present invention will be described in detail with reference to the drawings. In the drawings, the same or corresponding components are designated with the same reference signs to omit duplicate description. The scale of the drawings is not limited to the scale shown. It is also to be understood that the present invention is not necessarily limited to the description of the representative embodiments herein.

[Packaging Material for a Power Storage Device]

FIG. 1 is a cross-sectional view schematically showing an embodiment of a packaging material for a power storage device according to the present invention (first and the second aspects). As shown in FIG. 1, a packaging material (packaging material for a power storage device) 10 according to the present embodiment is a laminate including a base material layer 11, a first adhesive layer 12 formed on a surface of the base material layer 11, a metal foil layer 13 formed on a surface of the first adhesive layer 12 on a side facing away from the base material layer 11, an anti-corrosion treatment layer 14 formed on a surface of the metal foil layer 13 on a side facing away from the first adhesive layer 12, an adhesive resin layer 15 formed on a surface of the anti-corrosion treatment layer 14 on a side facing away from the metal foil layer 13, and a sealant layer 16 formed on a surface of the adhesive resin layer 15 on a side facing away from the anti-corrosion treatment layer 14, which are laminated in this order. In the packaging material 10, the base material layer 11 is the outermost layer, and the sealant layer 16 is the innermost layer. That is, the packaging material 10 is used such that the base material layer 11 is on an outer side of the power storage device and the sealant layer 16 is on an inner side of the power storage device. In the following, the individual layers will be described.

<Base Material Layer 11>

The base material layer 11 is provided for the purposes of imparting heat resistance to the packaging material in the sealing process when manufacturing a power storage device and providing measures against pinholes that can occur during processing or distribution. A resin layer having insulation properties is preferably used for the base material layer 11. Examples of such a layer that can be used include a single layer film formed of a stretched or unstretched film, such as a polyester film, polyamide film, and polypropylene film, or a multi-layer film formed of a laminate of two or more layers of the stretched or unstretched film. More specifically, a polyethylene terephthalate (PET) film and a nylon (Ny) film may be co-extruded using an adhesive resin, followed by stretching, for use as a co-extruded multi-layer stretched film.

The thickness of the base material layer 11 is preferably in the range of 6 to 40 μm, and more preferably in the range of 10 to 25 μm. When the thickness of the base material layer 11 is 6 μm or more, resistance to pinholes and insulation properties of the packaging material for a power storage device 10 are likely to be improved. When the thickness of the base material layer 11 is 40 μm or less, the deep drawing formability of the packaging material for a power storage device 10 is likely to be further improved.

<First Adhesive Layer 12>

The first adhesive layer 12 bonds the base material layer 11 to the metal foil layer 13. Examples of the material forming the first adhesive layer 12 specifically include a polyurethane resin, in which a bifunctional or more isocyanate compound is reacted on a base resin, such as a polyester polyol, polyether polyol, acrylic polyol, or carbonate polyol.

The polyester polyol is obtained using one or more dibasic acids and one or more diols. The dibasic acids may include, for example, an aliphatic dibasic acid, such as succinic acid, glutaric acid, adipic acid, pimelic acid, suberic acid, azelaic acid, sebacic acid, or brassylic acid, and an aromatic dibasic acid, such as isophthalic acid, terephthalic acid, or naphthalene dicarboxylic acid. The diols may include, for example, an aliphatic diol, such as ethylene glycol, propylene glycol, butanediol, neopentyl glycol, methylpentanediol, hexanediol, heptanediol, octanediol, nonanediol, decanediol, or dodecanediol, an alicyclic diol, such as cyclohexanediol and hydrogenated xylylene glycol, and an aromatic diol, such as xylylene glycol.

The polyester polyol may include a polyester urethane polyol or the like obtained by chain-elongating hydroxyl groups on both ends of a polyester polyol that is obtained using a dibasic and a diol mentioned above. The chain is elongated using an isocyanate compound, or an adduct, a biuret or an isocyanurate form of at least one isocyanate compound, selected from 2,4- or 2,6-tolylenediisocyanate, xylylene diisocyanate, 4,4'-diphenyl methane diisocyanate, methylene diisocyanate, isopropylene diisocyanate, lysine diisocyanate, 2,2,4- or 2,4,4-trimethylhexamethylenediisocyanate, 1,6-hexamethylenediisocyanate, methylcyclohexane diisocyanate, isophorone diisocyanate, 4,4'-dicyclohexylmethane diisocyanate, isopropylidene dicyclohexyl-4,4'-diisocyanate, and the like.

Examples of the polyether polyol that can be used include an ether polyol, such as polyethylene glycol, or polypropylene glycol, and a polyether urethane polyol obtained by allowing the above isocyanate compound as a chain extender to act on the polyether polyol.

Examples of the acrylic polyol that can be used include an acrylic resin obtained by polymerization using the above acrylic monomer.

The carbonate polyol can be obtained by reaction of a carbonate compound with a diol. Examples of the carbonate compound that can be used include dimethyl carbonate, diphenyl carbonate, or ethylene carbonate. Examples of the diol that can be used include an aliphatic diol, such as ethylene glycol, propylene glycol, butanediol, neopentyl glycol, methylpentanediol, hexanediol, heptanediol, octanediol, nonanediol, decanediol, or dodecanediol, an alicyclic diol, such as cyclohexanediol, or hydrogenated xylylene glycol, and an aromatic diol, such as xylylene glycol. Examples of the carbonate polyol include a carbonate polyol using one of the carbonate compounds mentioned above or a mixture of two or more thereof and one of the diols mentioned above or a mixture of two or more thereof, or a polycarbonate urethane polyol obtained by chain elongation using the isocyanate compound mentioned above.

These various polyols mentioned above can be used alone or in combination of two or more, according to the functions and performances required of the packaging material. The isocyanate compound mentioned above may be used as a curing agent in the base resins, to serve as a polyurethane adhesive.

To promote adhesion, the polyurethane resin mentioned above may be formulated using a carbodiimide compound, oxazoline compound, epoxy compound, phosphorus compound, silane coupling agent, or the like.

Examples of the carbodiimide compound include N,N'-di-o-toluyl carbodiimide, N,N'-diphenyl carbodiimide, N,N'-di-2,6-dimethylphenyl carbodiimide, N,N'-bis(2,6-diisopropylphenyl) carbodiimide, N,N'-dioctyl decyl carbodiimide, N-triyl-N'-cyclohexyl carbodiimide, N,N'-di-2,2-di-t-butylphenyl carbodiimide, N-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, and N,N'-di-p-tolyl carbodiimide.

Examples of the oxazoline compound include monooxazoline compounds, such as 2-oxazoline, 2-methyl-2-oxazoline, 2-phenyl-2-oxazoline, 2,5-dimethyl-2-oxazoline, 2,4- diphenyl-2-oxazoline, and dioxazoline compounds, such as 2,2'-(1,3-phenylene)-bis(2-oxazoline), 2,2'-(1,2-ethylene)-bis(2-oxazoline), 2,2'-(1,4-butylene)-bis(2-oxazoline), and 2,2'-(1,4-phenylene)-bis(2-oxazoline).

Examples of the epoxy compound include: a diglycidyl ether of an aliphatic diol such as 1,6-hexanediol, neopentyl glycol or polyalkylene glycol; a polyglycidyl ether of an aliphatic polyol such as sorbitol, sorbitan, polyglycerol, pentaerythritol, diglycerol, glycerol or trimethylolpropane; a polyglycidyl ether of an alicyclic polyol such as cyclohexane dimethanol; a diglycidyl ester or a polyglycidyl ester of an aliphatic or aromatic polyvalent carboxylic acid such as terephthalic acid, isophthalic acid, naphthalene dicarboxylic acid, trimellitic acid, adipic acid or sebacic acid; a diglycidyl ether or a polyglycidyl ether of a polyvalent phenol such as resorcinol, bis-(p-hydroxyphenyl)methane, 2,2-bis-(p-hydroxyphenyl) propane, tris-(p-hydroxyphenyl) methane or 1,1,2,2-tetrakis(p-hydroxyphenyl)ethane; a N-glycidyl derivative of an amine such as N,N'-diglycidyl aniline, N,N,N-diglycidyl toluidine or N,N,N',N'-tetraglycidyl-bis-(p-aminophenyl)methane; a triglycidyl derivative of an aminophenol; triglycidyltris(2-hydroxyethyl)isocyanurate; triglycidyl isocyanurate; an ortho-cresol epoxy; and a phenol novolac epoxy.

Examples of the phosphorous compound include tris(2, 4-di-t-butylphenyl) phosphite, tetrakis(2,4-di-t-butylphenyl) 4,4'-biphenylene phosphonite, bis(2,4-di-t-butylphenyl) pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl)phosphite, 1,1,3-tris(2-methyl-4-ditridecylphosphite-5-t-butyl-phenyl)butane, tris (mixed mono- and di-nonylphenyl)phosphite, tris (nonylphenyl)phosphite, and 4,4'-isopropylidenebis(phenyl-dialkylphosphite).

Examples of the silane coupling agent that can be used include various silane coupling agents, such as vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, and N-β(aminoethyl)-γ-aminopropyltrimethoxysilane.

The above polyurethane resin may be formulated using various other additives or stabilizers, according to the performances required of the adhesive.

The thickness of the first adhesive layer 12 is not limited specifically. However, from the viewpoint of obtaining a desired adhesive strength, followability, processability, and the like, the thickness of the first adhesive layer 12 is preferably in the range of 1 to 10 μm, and more preferably in the range of 3 to 7 μm, for example.

<Metal Foil Layer 13>

The metal foil layer 13 has water vapor barrier properties to prevent moisture from penetrating into the power storage device. The metal foil layer 13 has ductility for deep drawing. For the metal foil layer 13, various metal foils, such as aluminum and stainless steel, can be used. From the viewpoint of mass (specific gravity), moisture resistance, processability, and cost, an aluminum foil is preferable.

For the aluminum foil, a generally used soft aluminum foil can be used. However, to impart further resistance to pinholes, and ductility, during forming, an aluminum foil containing iron is preferably used. The content of iron in an aluminum foil is preferably in the range of 0.1 to 9.0 mass %, and more preferably in the range of 0.5 to 2.0 mass %, relative to a 100 mass % aluminum foil. When the content of iron is 0.1 mass % or more, a packaging material 10 of much better resistance to pinholes and ductility can be obtained. When the content of iron is 9.0 mass % or less, a packaging material 10 of much better flexibility can be obtained.

From the viewpoint of imparting a desired ductility during forming, an annealed soft aluminum foil (e.g., aluminum foil made of Japanese Industrial Standard material 8021 or 8079) is more preferable as an aluminum foil.

The thickness of the metal foil layer 13 is not limited specifically. However, taking account of the barrier properties, resistance to pinholes, and processability, the thickness of the metal foil layer 13 is preferably in the range of 9 to 200 μm, and more preferably in the range of 15 to 100 μm.

In the case of using an aluminum foil for the metal foil layer 13, an unprocessed aluminum foil may be used for an aluminum foil. However, from the viewpoint of imparting electrolytic solution resistance, a degreased aluminum foil is preferably used. Degreasing treatment is roughly categorized into wet degreasing and dry degreasing.

Examples of the wet degreasing include acid degreasing and alkaline degreasing. Examples of the acid used for acid degreasing include an inorganic acid, such as sulfuric acid, nitric acid, hydrochloric acid, or hydrogen fluoride. These inorganic acids may be used alone, or in combination of two or more. From the viewpoint of improving the etching effect of the aluminum foil, the inorganic acids may be formulated, as necessary, using various metal salts, which are supply sources of Fe ions, Ce ions, and other ions. Examples of the alkali used for alkaline degreasing include a strong etching alkali, such as sodium hydroxide. A weak alkali or an alkali formulated with a surfactant may be used. These degreasing treatments are performed using immersion or spraying.

The dry degreasing may be performed during the process of annealing aluminum. Besides degreasing treatment, flame treatment, corona treatment, and the like may be performed. Examples of the degreasing treatment also include one in which contaminants are oxidatively decomposed and removed using oxygen radicals generated by applying ultraviolet rays of a certain wavelength to the aluminum foil.

When degreasing an aluminum foil, only one surface of the aluminum foil may be degreased, or to both surfaces may be degreased.

<Anti-Corrosion Treatment Layer 14>

The anti-corrosion treatment layer 14 is provided to prevent the metal foil layer 13 from being corroded by the electrolyte solution, or by hydrogen fluoride generated by reaction of the electrolyte solution with moisture. The anti-corrosion treatment layer 14 is formed, for example, by degreasing treatment, hydrothermal modification treatment, anodic oxidation treatment, chemical conversion treatment, or a combination of these treatments.

Degreasing treatment can be acid degreasing or alkaline degreasing. In a method of acid degreasing, an inorganic acid, such as sulfuric acid, nitric acid, hydrochloric acid, or hydrogen fluoride, can be used alone or a mixed solution of these acids may be used. In the acid degreasing, an acid degreasing agent may be used which is obtained by dissolving a fluorine-containing compound, such as monosodium ammonium difluoride, in an inorganic acid mentioned above. In the case of using aluminum foil as the metal foil layer 13 specifically, use of the acid degreasing agent is effective in terms of hydrofluoric acid resistance, in that aluminum is effectively degreased, and fluorides can render the aluminum surface passive. In the alkaline degreasing, methods using sodium hydroxide and the like may be used.

The hydrothermal modification treatment may be, for example, a boehmite treatment of immersing aluminum foil in boiling water to which triethanolamine has been added.

The anodic oxidation treatment may be, for example, alumite treatment.

The chemical conversion treatment may be an immersion type chemical conversion treatment or a coating type chemical conversion treatment. Examples of the immersion type chemical conversion treatment include chromate treatment, zirconium treatment, titanium treatment, vanadium treatment, molybdenum treatment, calcium phosphate treatment, strontium hydroxide treatment, cerium treatment, ruthenium treatment, and various chemical conversion treatments of mixed phases of these treatments. The coating type chemical conversion treatment may be a method of applying a coating agent having anti-corrosion performance to the metal foil layer 13.

Of these anti-corrosion treatments, any one of hydrothermal modification treatment, anodic oxidation treatment, and chemical conversion treatment may be used for forming at least a part of the anti-corrosion treatment layer. In this case, a degreasing treatment mentioned above is preferably performed in advance. When a degreased metal foil is used as the metal foil layer 13, degreasing treatment is not necessary during formation of the anti-corrosion treatment layer 14.

The coating agent used for coating type chemical conversion treatment preferably contains trivalent chromium. The coating agent may include at least one polymer selected from the group consisting of cationic polymers and anionic polymers, described later.

Of the above treatments, the hydrothermal modification treatment and the anodic oxidation treatment specifically cause the surface of aluminum foil to be dissolved with a treatment agent to form an aluminum compound (boehmite and anodized aluminum) having good corrosion resistance. Thus, these treatments, which form a co-continuous structure from the metal foil layer 13 of an aluminum foil to the anti-corrosion treatment layer 14, are encompassed by the definition of the chemical conversion treatment. The anti-corrosion treatment layer 14 can also be formed by only a pure coating method, which is not included in the definition of the chemical conversion treatment, as described later. This method may be, for example, a method using a sol of a rare earth element oxide, such as cerium oxide having a mean particle size of 100 nm or less, which is a material exerting an anti-corrosion effect (inhibitor effect) for aluminum and environmentally preferable. Using this method, even a generally used coating method can exert an anti-corrosion effect to the metal foil, such as an aluminum foil.

Examples of the sol of a rare earth element oxide include sols using various types of solvents, such as water-, alcohol-, hydrocarbon-, ketone-, ester-, and ether-based solvents. Among them, a water-based sol is preferable.

For the sol of a rare earth element oxide, a dispersion stabilizer is typically used to stabilize the dispersion of the sol. The dispersion stabilizer includes an inorganic acid, such as nitric acid, hydrochloric acid, or phosphoric acid, or salts thereof, or an organic acid, such as acetic acid, malic acid, ascorbic acid, or lactic acid. Of these dispersion stabilizers, phosphoric acid is specifically expected to exert the following effects in the packaging material 10 of: (1) Stabilizing dispersion of a sol; (2) Improving adhesion to the metal foil layer 13 using the aluminum chelating performance of phosphoric acid; (3) Imparting electrolytic solution resistance by capturing aluminum ions that have eluted due to the effect of hydrofluoric acid (forming a passive state); and (4) Improving cohesion of the anti-corrosion treatment layer 14 (oxide layer) due to the tendency of phosphoric acid to cause dehydration condensation even at low temperature.

Examples of the phosphoric acid or a salt thereof include orthophosphoric acid, pyrophosphoric acid, metaphosphoric acid, and alkali metal salts or ammonium salts thereof. Among them, a condensed phosphoric acid, such as trimetaphosphoric acid, tetrametaphosphoric acid, hexametaphosphoric acid or ultrametaphosphoric acid, or alkali metal salts or ammonium salts thereof, is preferable for expressing functions in the packaging material 10. Taking account of the dry film forming properties (dry capacity and heat capacity) when forming the anti-corrosion treatment layer 14 made of a rare earth element oxide by various coating methods using the sol of a rare earth element oxide, a sodium salt is more preferable, because the sodium salt exerts good dehydration condensation performance at low temperature. As phosphate, a water-soluble salt is preferable.

The compounding ratio of the phosphoric acid (or a salt thereof) to the rare earth element oxide is preferably in the range of 1 to 100 parts by mass relative to 100 parts by mass of the rare earth element oxide. When the compounding ratio is 1 part by mass or more to 100 parts by mass of the rare earth element oxide, the rare earth element oxide sol becomes more stable, resulting in obtaining a better function of the packaging material 10. The compounding ratio is more preferably 5 parts by mass or more relative to 100 parts by mass of the rare earth element oxide. When the compounding ratio is 100 parts by mass or less relative to 100 parts by mass of the rare earth element oxide, the function of the rare earth element oxide sol is enhanced, resulting in exerting good performance of preventing erosion by the electrolytic solution. The compounding ratio is more preferably 50 parts by mass or less relative to 100 parts by mass of the rare earth element oxide, and still more preferably 20 parts by mass or less.

Since the anti-corrosion treatment layer 14 formed of the rare earth element oxide sol is an aggregate of inorganic particles, the cohesion of the layer itself may become lower even after the dry curing process. Therefore, to supplement the cohesion, the anti-corrosion treatment layer 14 in this case is preferably complexed with an anionic or cationic polymer set forth below.

A specific example of the anionic polymer is a polymer having a carboxyl group, examples of which include poly (meth)acrylic acid (or a salt thereof) or a copolymer obtained by copolymerization with poly(meth)acrylic acid as a principal component. Examples of the copolymerization component of the copolymer include: an alkyl (meth)acrylate monomer (the alkyl group may include a methyl group, ethyl group, n-propyl group, i-propyl group, n-butyl group, i-butyl group, t-butyl group, 2-ethylhexyl group, or cyclohexyl group); an amido group-containing monomer, such as (meth)acrylamide, N-alkyl (meth)acrylamide, N,N-dialkyl (meth)acrylamide (the alkyl group includes a methyl group, ethyl group, n-propyl group, i-propyl group, n-butyl group, i-butyl group, t-butyl group, 2-ethylhexyl group or cyclohexyl group), N-alkoxy (meth)acrylamide, N,N-dialkoxy (meth)acrylamide (of which examples of alkoxy groups include a methoxy group, ethoxy group, butoxy group, or isobutoxy group), N-methylol (meth)acrylamide or N-phenyl (meth)acrylamide; a hydroxyl group-containing monomer, such as 2-hydroxyethyl (meth)acrylate or 2-hydroxypropyl (meth)acrylate; a glycidyl group-containing monomer, such as glycidyl (meth)acrylate or allyl glycidyl ether; a silane-containing monomer such as (meth)acryloxypropyl trimethoxysilane or (meth)acryloxypropyl triethoxysilane; and an isocyanate group-containing monomer, such as (meth)acryloxypropyl isocyanate.

These anionic polymers play a role of improving stability of the anti-corrosion treatment layer 14 (oxide layer) obtained using a rare earth element oxide sol. This is achieved by the effects of protecting a hard, brittle oxide layer with an acrylic resin component and trapping (as a cation catcher) ionic contaminants (particularly, sodium ions) derived from a phosphate contained in the rare earth oxide sol. That is, when alkali metal ions, such as sodium ions or alkaline earth metal ions, are contained specifically in the anti-corrosion treatment layer 14 obtained using the rare earth element oxide sol, the anti-corrosion treatment layer 14 is prone to be degraded at the part containing the ions, as a starting point. To address this issue, the sodium ions, for example, contained in the rare earth element oxide sol are fixed by the anionic polymer to improve durability of the anti-corrosion treatment layer 14.

The anti-corrosion treatment layer 14 obtained by combining the anionic polymer and the rare earth element oxide sol has anti-corrosion performance equivalent to that of the anti-corrosion treatment layer 14 formed by applying chromate treatment to an aluminum foil. The anionic polymer preferably has a structure in which an essentially water-soluble polyanionic polymer is cross-linked. Examples of a crosslinker used for forming this structure include a compound having an isocyanate group, glycidyl group, carboxy group, or oxazoline group.

Examples of the compound having an isocyanate group include a diisocyanate, such as tolylene diisocyanate, xylylene diisocyanate, or a hydrogenation product thereof, hexamethylene diisocyanate, 4,4'-diphenylmethane diisocyanate, or a hydrogenation product thereof, or isophorone diisocyanate; a polyisocyanate, such as an adduct prepared by reacting these isocyanates with a polyhydric alcohol, such as trimethylolpropane, a biuret obtained by reacting the isocyanates with water, or an isocyanurate that is a trimer; or a blocked polyisocyanate in which these polyisocyanates are blocked with an alcohol, a lactam, an oxime, or the like.

Examples of the compound having a glycidyl group include an epoxy compound obtained by allowing epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; an epoxy compound obtained by allowing epichlorohydrin to act on a polyhydric alcohol, such as glycerol, polyglycerol, trimethylolpropane, pentaerythritol, or sorbitol; and an epoxy compound obtained by permitting epichlorohydrin to act on a dicarboxylic acid, such as phthalic acid, terephthalic acid, oxalic acid, or adipic acid.

Examples of the compound having a carboxyl group include various aliphatic or aromatic dicarboxylic acids. Alternatively, a poly(meth)acrylic acid, or an alkali (or alkaline earth) metal salt of a poly(meth)acrylic acid may be used.

Examples of the compound having an oxazoline group include a low molecular weight compound having two or more oxazoline units, or when using a polymerizable monomer, such as isopropenyloxazoline, a compound copolymerized with an acrylic monomer, such as (meth)acrylic acid, alkyl ester (meth)acrylate, or hydroxyalkyl (meth)acrylate.

An anionic polymer may be selectively reacted with amine and a functional group, like a silane coupling agent, to achieve siloxane bonding in the cross-linking point. In this case, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, γ-isocyanatopropyltriethoxysilane, or the like may be used. Among them, epoxysilane, aminosilane, or isocyanate silane is specifically preferable, when reactivity with the anionic polymer or a copolymer thereof is considered.

The ratio of these crosslinkers to the anionic polymer is preferably in the range of 1 to 50 parts by mass to 100 parts by mass of the anionic polymer, and more preferably in the range of 10 to 20 parts by mass. When the ratio of the crosslinker is 1 part by mass or more relative to 100 parts by mass of the anionic polymer, the cross-linked structure is easily sufficiently formed. When the ratio of the crosslinker is 50 parts by mass or less relative to 100 parts by mass of the anionic polymer, pot life of the coating fluid is improved.

The method of cross-linking the anionic polymer is not limited to the use of above crosslinkers, but may be a method in which ionic crosslinks are formed using a titanium or zirconium compound.

Examples of the cationic polymer include amine-containing polymers, such as polyethyleneimine, an ionic polymer complex made of polyethyleneimine and a polymer having a carboxylic acid, a primary amine-grafted acrylic resin obtained by grafting a primary amine onto a main acrylic backbone, a polyallylamine or a derivative thereof, and an aminophenol.

The cationic polymer is preferably used in combination with a crosslinker having a functional group that can react with amine/imine, such as a carboxy group or a glycidyl group. The crosslinker that can be used in combination with the cationic polymer may be a polymer having carboxylic acid that forms an ionic polymer complex with polyethyleneimine. Examples of such a polymer include a polycarboxylic acid (salt), such as polyacrylic acid or an ionic salt thereof, or a copolymer obtained by introducing a comonomer into the polycarboxylic acid (salt), and a polysaccharide having a carboxyl group, such as carboxymethyl cellulose or an ionic salt thereof. Examples of the polyallylamine include a homopolymer or a copolymer such as of allylamine, allylamine amidosulfate, diallylamine or dimethylallylamine. These amines can be free amines or may be stabilized by acetic acid or hydrochloric acid. Copolymer components that can be used include maleic acid, sulfur dioxide and the like. A primary amine may be partially methoxylated to impart thermal crosslinkability thereto, for use as a type of amine. An aminophenol can also be used. An allylamine or a derivative thereof is particularly preferable.

In the present embodiment, the cationic polymer is also described as a component configuring the anti-corrosion treatment layer 14. This is because, as a result of investigation using various compounds for imparting electrolytic solution resistance and hydrogen fluoride resistance required of a packaging material for a power storage device, the cationic polymer was found to be a compound that can impart electrolytic solution resistance and hydrogen fluoride resistance. The factor is assumed to be that the cationic group traps fluorine ions (serves as an anion catcher) to prevent the aluminum foil from being damaged.

The cationic polymer is a more preferable material from the viewpoint of improving adhesion. It is more preferable that, similarly to the anionic polymer mentioned above, the cationic polymer, which is also water soluble, is permitted to have a cross-linked structure to impart water resistance thereto. The crosslinkers that can be used for forming a cross-linked structure in the cationic polymer may be those which are mentioned in the section on the anionic polymer. When using a rare earth element oxide sol as the anti-corrosion treatment layer 14, a cationic polymer may be used as its protective layer, instead of using the anionic polymers mentioned above.

In the anti-corrosion treatment layer obtained through chemical conversion treatment represented by chromate treatment, a graded structure with aluminum foil is formed by treating an aluminum foil using hydrofluoric acid, hydrochloric acid, sulfuric acid, nitric acid, or a chemical conversion treatment agent formulated using a salt of these acids, and allowing chromium or non-chromium compound to act on the treated aluminum foil to form a chemical conversion treatment layer on the aluminum foil. However, chemical conversion treatment, which involves use of a chemical conversion treatment agent containing an acid, can deteriorate the working environment or cause corrosion in the coating device. Unlike the chemical conversion treatment represented by chromate treatment, the coated type anti-corrosion treatment layer 14 described above does not require a graded structure on the metal foil layer 13 of an aluminum foil. Thus, the coating agent is not restricted to have acidic, alkaline, or neutral properties, and hence a good working environment is realized. For environmental health, alternatives to the chromate treatment, which uses a chromium compound, are sought. From this viewpoint as well, the coated type anti-corrosion treatment layer 14 is preferable.

As will be understood from the description above, examples of combinations of the coated type anti-corrosion treatments include: (1) Rare earth element oxide sol alone; (2) Anionic polymer alone; (3) Cationic polymer alone; (4) Rare earth element oxide sol+anionic polymer (laminated composite); (5) Rare earth element oxide sol+cationic polymer (laminated composite); (6) (Rare earth element oxide sol+anionic polymer: laminated composite)/cationic polymer (multi-layer); and (7) (Rare earth element oxide sol+ cationic polymer: laminated composite)/anionic polymer (multi-layer). Among them, (1) and (4) to (7) are preferable, and (4) to (7) are specifically preferable. However, the present embodiment is not limited to the above combinations. As an example of selecting anti-corrosion treatment, the cationic polymer is a significantly preferable material from the viewpoint of exerting good adhesion to a modified polyolefin resin, which will be mentioned in relation to a sealant adhesive layer (adhesive resin layer or second adhesive layer) described later. Thus, when forming the sealant adhesive layer with a modified polyolefin resin, it may be so designed that a cationic polymer is provided to the surface contacting the sealant adhesive layer (e.g. configurations (5) and (6)).

The anti-corrosion treatment layer 14 is not limited to the layer described above. For example, the anti-corrosion treatment layer 14 may be formed using a treatment agent, like a coating type chromate of a known technique, which is obtained by formulating a resin binder (e.g. aminophenol) using phosphoric acid and a chromium compound. Use of this treatment agent can provide a layer having both anti-corrosion function and adhesion. Although stability of the coating fluid has to be considered, a one-liquid coating agent of a rare earth element oxide sol and a polycationic polymer or polyanionic polymer may be prepared in advance and applied for providing a layer having both anti-corrosion function and adhesion.

Mass per unit area of the anti-corrosion treatment layer 14 is preferably in the range of 0.005 to 0.200 $g/m^2$, and more preferably in the range of 0.010 to 0.100 $g/m^2$, whether the structure is a multi-layer or a single-layer. When the mass per unit area is 0.005 $g/m^2$ or more, anti-corrosion function is easily imparted to the metal foil layer 13. Even if the mass per unit area exceeds 0.200 $g/m^2$, anti-corrosion function basically remains unchanged. When a rare earth element oxide sol is used, and when the coating film is thick, curing by the heat in drying may be insufficient, which may lead to degradation of cohesion. The thickness of the anti-corrosion treatment layer 14 can be converted from its specific gravity.

<Adhesive Resin Layer 15>

The adhesive resin layer 15 is configured containing an adhesive resin composition as a principal component and an additive component as necessary. Although not specifically limited, the adhesive resin composition preferably contains a modified polyolefin resin (a) component and a macro-phase-separated thermoplastic elastomer (b) component. The additive component preferably contains polypropylene having an atactic structure, and/or a propylene-α-olefin copolymer. Among others, the additive component more preferably contains polypropylene having an atactic structure, and/or a propylene-α-olefin copolymer (c) having an atactic structure. In the following, the components will be individually described.

(Modified Polyolefin Resin (a))

The modified polyolefin resin is preferably a resin in which an unsaturated carboxylic acid derivative component derived from any of an unsaturated carboxylic acid, an unsaturated carboxylic acid anhydride, and an unsaturated carboxylic acid ester is graft-modified into a polyolefin resin.

Examples of the polyolefin resin include a low-, medium- or high-density polyethylene, an ethylene-α-olefin copolymer, homo-, block- or random-polypropylene, or a propylene-α-olefin copolymer. However, from the viewpoint of adhesion to the sealant layer 16, a polypropylene resin is preferable.

Examples of the compound used for graft-modification of these polyolefin resins include an unsaturated carboxylic acid derivative component derived from any of unsaturated carboxylic acid, unsaturated carboxylic acid anhydride, and unsaturated carboxylic acid ester.

Specifically, examples of the unsaturated carboxylic acid include acrylic acid, methacrylic acid, maleic acid, fumaric acid, itaconic acid, citraconic acid, tetrahydrophthalic acid, and bicyclo[2.2.1]hept-2-ene-5,6-dicarboxylic acid.

Examples of the unsaturated carboxylic acid anhydride include maleic anhydride, itaconic anhydride, citraconic anhydride, tetrahydrophthalic anhydride, and bicyclo[2.2.1] hept-2-ene-5,6-dicarboxylic acid anhydride.

Examples of the unsaturated carboxylic acid ester include methyl acrylate, methyl methacrylate, ethyl methacrylate, butyl methacrylate, dimethyl maleate, monomethyl maleate, diethyl fumarate, dimethyl itaconate, diethyl citraconate, dimethyl-tetrahydrophthalic anhydride, and dimethyl bicyclo[2.2.1]hept-2-ene-5,6-dicarboxlyate.

The modified polyolefin resin (a) can be produced by graft polymerizing (graft modifying) 0.2 to 100 parts by mass of the above unsaturated carboxylic acid derivative component with 100 parts by mass of a base polyolefin resin in the presence of a radical initiator. The reaction temperature of graft modification is preferably in the range of 50 to 250° C., and more preferably in the range of 60 to 200° C. Although reaction time is appropriately set according to a manufacturing method, in the case of a melt graft polymerization using a twin-screw extruder, for example, the reaction time is preferably in the range of 2 to 30 minutes and more preferably in the range of 5 to 10 minutes, that is, within the residence time of the extruder. Graft modification can also be carried out under the conditions of either normal pressure or applied pressure.

Examples of the radical initiator used in graft modification include an organic peroxide, such as alkyl peroxide, aryl peroxide, acyl peroxide, ketone peroxide, peroxyketal, peroxycarbonate, peroxyester, or hydroperoxide.

These organic peroxides can be appropriately selected according to the conditions of reaction temperature and reaction time mentioned above. For example, in the case of melt graft polymerization using a twin-screw extruder, alkyl peroxide, peroxyketal or peroxyester is preferable, and more specifically, di-t-butyl peroxide, 2,5-dimethyl-2,5-di-t-butylperoxy-hexyne-3-benzene, or dicumyl peroxide is preferable.

A polyolefin resin that has been modified with maleic anhydride is preferable for the modified polyolefin resin (a). For example, Admer manufactured by Mitsui Chemicals Inc., Modic manufactured by Mitsubishi Chemical Corp., or Adtex manufactured by Nippon Polyethylene Corp is appropriate. The modified polyolefin resin (a) component has good reactivity with polymers having various metals or various functional groups. Thus, adhesion can be imparted to the adhesive resin layer 15 using the reactivity, and thus electrolytic solution resistance can be improved.

(Macrophase-Separated Thermoplastic Elastomer (b))

The macrophase-separated thermoplastic elastomer (b) forms a macrophase-separated structure of a dispersed phase size in the range of 200 nm to 50 μm or less, relative to the modified polyolefin resin (a).

When the adhesive resin composition contains the macrophase-separated thermoplastic elastomer (b) component, residual stress produced in laminating the modified polyolefin resin (a) component, for example, which is a principal component configuring the adhesive resin layer 15, can be released, and thermoplastic adhesion can be imparted to the adhesive resin layer 15. Therefore, adhesion of the adhesive resin layer 15 is further improved to obtain a packaging material 10 having better electrolytic solution resistance.

The macrophase-separated thermoplastic elastomer (b) is present in the form of a sea-island structure on the modified polyolefin resin (a). If the dispersed phase size is 200 nm or less, it is difficult to improve viscoelastic adhesion. If the dispersed phase size exceeds 50 μm, lamination adaptability (processability) is considerably decreased, and physical strength of the adhesive resin layer 15 is prone to be decreased, because the modified polyolefin resin (a) and the macrophase-separated thermoplastic elastomer (b) are essentially immiscible with each other. Accordingly, the dispersed phase size is preferably in the range of 500 nm to 10 μm.

Examples of the macrophase-separated thermoplastic elastomer (b) include polyolefin thermoplastic elastomers obtained by copolymerizing α-olefin selected from 1-butene, 1-pentene, 1-hexene, 1-octene, and 4-methyl-1-pentene with ethylene and/or propylene.

Commercially available products can be used as the macrophase-separated thermoplastic elastomer (b) component. For example, Tafmer manufactured by Mitsui Chemicals Inc., Zelas manufactured by Mitsubishi Chemical Corp., or Catalloy manufactured by Montell Co. is appropriate.

In the adhesive resin layer 15, the content of the macrophase-separated thermoplastic elastomer (b) component with respect to the modified polyolefin resin (a) component in the adhesive resin composition is preferably in the range of 1 to 40 parts by mass, and more preferably in the range of 5 to 30 parts by mass, relative to 100 parts by mass of the modified polyolefin resin (a) component. If the content of the macrophase-separated thermoplastic elastomer (b) component is less than 1 part by mass, adhesion of the adhesive resin layer is not expected to be improved. If the content of the macrophase-separated thermoplastic elastomer (b) component exceeds 40 parts by mass, processability is easily considerably decreased, because of the intrinsically low miscibility between the modified polyolefin resin (a) component and the macrophase-separated thermoplastic elastomer (b) component. Since the macrophase-separated thermoplastic elastomer (b) component is not a resin exhibiting adhesiveness, adhesion of the adhesive resin layer 15 to other layers, such as the sealant layer 16 and the anti-corrosion treatment layer 14, is prone to be reduced.

(Polypropylene with Atactic Structure and/or Propylene-α-Olefin Copolymer (c) with Atactic Structure)

The adhesive resin layer 15 preferably contains, as an additive component, a polypropylene with an atactic structure and/or a propylene-α-olefin copolymer with an atactic structure (hereinafter simply referred to as component (c)). The component (c) is a monolithic amorphous resin component.

The polypropylene with an atactic structure and/or the propylene-α-olefin copolymer with an atactic structure refers to the side chain of at least one of the propylene and α-olefin having an atactic structure. In other words, such a structure corresponds to the following four cases.

(1) The alignment of a side chain in the propylene chain of the polypropylene is an atactic structure.

(2) The alignment of a side chain in the propylene chain of the propylene-α-olefin copolymer is an atactic structure.

(3) The alignment of a side chain in the α-olefin chain of the propylene-α-olefin copolymer is an atactic structure.

(4) The alignment of a side chain of the propylene/α-olefin complex chain of the propylene-α-olefin copolymer is an atactic structure.

The atactic structure of the polypropylene or the propylene-α-olefin copolymer of the present embodiment can be confirmed through the following method, for example. First, homopolypropylene is polymerized using a transition metal complex used in the polymerization of the polypropylene or the propylene-α-olefin copolymer of the present embodiment. Subsequently, $^{13}$C-NMR spectra are measured to obtain F(1) defined by the following equation, where the signal intensities attributed to mm, mr, and rr of propylene methyl carbon are expressed by [mm], [mr], and [rr], respectively. When F(1) obtained from the equation has a value in the range of 40 or more to 60 or less, the homopolypropylene obtained by the polymerization is determined to have an atactic structure. F(1) preferably has a value in the range of 43 or more to 57 or less, and more preferably in the range of 45 or more to 55 or less. When F(1) has a value falling in the above ranges, the occurrence of cracks due to the stress during cold forming, for example, is further reduced in the adhesive resin layer, and insulation properties after being formed are further improved.

$$F(1)=100\times[mr]/([mm]+[mr]+[rr])$$

The following description addresses the effect of adding the additive component (c) to the adhesive resin composition as a principal component of the adhesive resin layer 15.

The component (c) is miscible with the modified polyolefin resin (a) component of the adhesive resin composition when the adhesive resin layer 15 is in a molten state.

However, the component (c) is discharged outside the crystal and phase-separated, during crystallization due to cooling. Thus, the component (c) does not hinder crystallinity of the modified polyolefin resin (a) component as a principal component of the adhesive resin composition. Addition of the component (c) to the adhesive resin layer 15 dilutes the concentration of the modified polyolefin resin (a) component to suppress crystal growth, and hence reduces the crystal size (spherulite size) of the adhesive component (i.e. modified polyolefin resin (a) component) of the base resin. The component (c) discharged outside the crystal is uniformly dispersed around the micro-spherulites of the modified polyolefin resin (a) component.

It is known that whitening occurs when packaging materials are cold-formed. Herein, the mechanism of whitening will be described taking the adhesive resin layer 15 as an example which is obtained by formulating the modified polyolefin resin (a) using the macrophase-separated thermoplastic elastomer (b).

(1) The modified polyolefin resin (a) in the adhesive resin layer 15 is crystallized due to heat treatment during thermal lamination.

(2) Since the modified polyolefin resin (a) is immiscible with the macrophase-separated thermoplastic elastomer (b), strain occurs on the interface between them due to the crystallization behavior of (1).

(3) With the application of stress when formed, cracks occur in the interface between them to form voids and crazes.

(4) Light is scattered by the voids and crazes and irregularly reflected, thereby causing whitening.

Specifically, the following matters are known to be importance to prevent whitening. The matters are: to prevent the progress of crystallization of the modified polyolefin resin (a) ascribed to the quantity of heat at the time of thermal lamination (i.e. the modified polyolefin resin (a) is made less prone to crystallization); and to improve adhesion between the modified polyolefin resin (a) and the macrophase-separated thermoplastic elastomer (b).

In this regard, with the addition of the component (c) as an additive component, to the adhesive resin composition as a principal component of the adhesive resin layer 15, the crystal size (spherulite size) of the modified polyolefin resin (a) component can be decreased. Thus, flexible and tenacious film properties are obtained. With the uniform dispersion of the component (c) around the modified polyolefin resin (a), stress is uniformly relaxed to thereby minimize the occurrence of voids and crazes, which is considered to lead to mitigating whitening of the packaging material 10 due to the stress applied during forming.

As described above, with the addition of the component (c) as an additive component, to the adhesive resin composition as a principal component of the adhesive resin layer 15, transparency of the adhesive resin layer 15 is enhanced, and whitening due to the stress applied during forming is mitigated. Thus, whitening due to forming is improved, and insulation properties (bending resistance) in relation to bending stress of the packaging material 10 are improved. Since flexibility is imparted to the packaging material, while crystallinity of the modified polyolefin resin (a) component is retained in the adhesive resin layer 15, lamination strength is prevented from being lowered when the electrolytic solution of the packaging material 10 is swollen.

With the addition of the component (c) as an additive component, to the adhesive resin composition as a principal component of the adhesive resin layer 15, flexibility can be imparted to the packaging material, while crystallinity of the modified polyolefin resin (a) component is retained in the adhesive resin layer 15. Thus, lamination strength is prevented from being lowered when the electrolytic solution of the packaging material 10 is swollen, and occurrence of voids and crazes due to the stress during cold forming can be reduced. Accordingly, insulation properties after forming are further improved.

The ratio of the component (c) in the adhesive resin layer 15 is preferably 2.5 mass %, and more preferably 5 mass % or more, at the lowest, and is preferably 60 mass % at the highest. If the ratio of the component (c) in the adhesive resin layer 15 is less than 2.5 mass %, the above-described effect of adding the component (c) is unlikely to be sufficiently obtained. If the ratio exceeds 60 mass % (i.e. if the ratio of the adhesive resin composition is less than 40 mass %), adhesion of the adhesive resin layer 15 to the other layers, such as the sealant layer 16 and the anti-corrosion treatment layer 14, is likely to be reduced.

(Propylene-α-Olefin Copolymer (d) with Isotactic Structure)

In addition to the component (c), the adhesive resin layer 15 preferably further contains a propylene-α-olefin copolymer with an isotactic structure (hereinafter simply referred to as component (d)) as an additive component.

In the adhesive resin component as a principal component of the adhesive resin layer 15, the component (d) acts as a miscible rubber component when the modified polyolefin resin (a) is specifically a polypropylene adhesive resin, and suppresses crystallization of the modified polyolefin resin (a).

That is, with further addition of the component (d) as an additive component, to the adhesive resin component as a principal component of the adhesive resin layer 15, flexibility to mitigate stress can be imparted to the packaging material. Thus, the heat sealing strength (specifically electrolytic solution resistance) and degassing and sealing strength are improved, while reducing degradation of the electrolytic solution lamination strength. With the combination of the components (c) and (d) as additive components, whitening and bending-resistance insulation are further improved.

With the further addition of the component (d) as an additive component, to the adhesive resin component as a principal component of the adhesive resin layer 15, flexibility to mitigate stress can be imparted to the packaging material, and occurrence of voids and crazes due to the stress during cold forming is reduced. Thus, insulation properties after forming are further improved.

The ratio of the additive component in the adhesive resin layer 15 (i.e. total amount of the components (c) and (d)) is preferably in the range of 5 to 60 mass %. If the ratio of the additive component in the adhesive resin layer 15 is less than 5 mass % (i.e. if the ratio of the adhesive resin composition exceeds 95 mass %), the above-described effect of adding the additive is unlikely to be sufficiently obtained. If the ratio exceeds 60 mass % (i.e. if the ratio of the adhesive resin composition is less than 40 mass %), adhesion of the adhesive resin layer 15 to the other layers, such as the sealant layer 16 and the anti-corrosion treatment layer 14, is likely to be reduced.

The component (c) as an additive component of the adhesive resin layer 15 may be analyzed based on steric regularity evaluation using nuclear magnetic resonance (NMR) spectrometry, for example, to fix the quantity.

The component (d) may be analyzed using Fourier transform infrared (FT-IR) spectroscopy to create an analytical curve with an absorber attributed to a branch of α-olefin, and an absorber attributed to a characteristic absorber of the modified polyolefin resin (a), to thereby confirm the compounding ratio.

In addition to the adhesive resin composition (i.e. the modified polyolefin resin (a) component and the macro-phase-separated thermoplastic elastomer (b) component) and the additive component (i.e. the components (c) and (d)), the adhesive resin layer 15 may contain various additives, such as a fire retardant, slip agent, anti-blocking agent, antioxidant, light stabilizer, and tackifier, as necessary.

The thickness of the adhesive resin layer 15 is not limited specifically. However, from the viewpoint of mitigating stress, penetration of moisture and electrolytic solution, the thickness of the adhesive resin layer 15 is preferably equal to or less than the thickness of the sealant layer 16. That is, from the above viewpoint, the thickness of the adhesive resin layer 15 is preferably in the range of 5 to 100 μm, and more preferably in the range of 10 to 60 μm, for example, and equal to or less than the thickness of the sealant layer 16.

<Sealant Layer 16>

The sealant layer 16 imparts sealability to the packaging material 10 by heat sealing. The sealant layer 16 may be a single layer or a multi-layer.

(Sealant Layer According to First Aspect)

The sealant layer 16 according to a first aspect includes a layer made of a resin composition containing: 60 to 95 mass % propylene-ethylene random copolymer (A); and 5 to 40 mass % polyolefin elastomer (B) including 1-butene as a comonomer, with a melting point of 150° C. or less. The sealant layer 16 may be formed of a resin composition containing: 60 to 95 mass % propylene-ethylene random copolymer (A); and 5 to 40 mass % polyolefin elastomer (B) including 1-butene as a comonomer, with a melting point of 150° C. or less. In the following, the components will be individually described.

(Propylene-Ethylene Random Copolymer (A))

The propylene-ethylene random copolymer (A) has good heat-sealing properties at low temperature, compared with a propylene-ethylene block copolymer and a propylene homopolymer, improving sealing properties in relation to the electrolytic solution, and reducing excess sealed portions due to the influence of the polyolefin elastomer (B).

In the propylene-ethylene random copolymer (A), the content of ethylene is preferably in the range of 0.1 to 10 mass %, more preferably in the range of 1 to 7 mass %, and more preferably in the range of 2 to 5 mass %. When the content of ethylene is 0.1 mass % or more, the effect of lowering the melting point is likely to be sufficiently obtained by copolymerizing ethylene, and sealing properties in relation to the electrolytic solution is likely to be further improved. When the content of ethylene is 10 mass % or less, excessive lowering of the melting point is likely to be prevented, and excess sealed portions are likely to be further reduced. The content of ethylene can be calculated from the mixing ratio of the monomer when polymerized. The content of ethylene can be measured such as by infrared absorption spectrometry (IR) or a nuclear magnetic resonance absorption method ($^{13}$C-NMR, $^1$H-NMR).

The melting point of the propylene-ethylene random copolymer (A) is preferably in the range of 120 to 145° C., and more preferably in the range of 125 to 140° C. When the melting point is 120° C. or more, excess sealed portions are likely to be further reduced. When the melting point is 145° C. or less, sealing properties in relation to the electrolytic solution are likely to be further improved.

The weight average molecular weight of the propylene-ethylene random copolymer (A) is preferably appropriately adjusted so that the melting point falls in the above ranges. However, the weight average molecular weight is preferably in the range of 10,000 to 10,000,000, and more preferably in the range of 100,000 to 1,000,000.

The propylene-ethylene random copolymer (A) may be an acid-modified copolymer. For example, the propylene-ethylene random copolymer (A) may be an acid-modified propylene-ethylene random copolymer obtained by graft modifying a maleic anhydride. Using the acid-modified propylene-ethylene random copolymer, adhesion to tab leads is retained in the absence of a tab sealant.

Such propylene-ethylene random copolymers (A) can be used alone or in combination of two or more.

In the resin composition for forming the sealant layer, the content of the component (A) is in the range of 60 to 95 mass % relative to the total solid content of the resin composition, preferably in the range of 60 to 90 mass %, and more preferably in the range of 60 to 85 mass %. When the content of the component (A) is 60 mass % or more, the sealing properties in relation to the electrolytic solution are improved by the effect of using the component (A). When the content of the component (A) is 60 mass % or more, excessive presence of the component (B) is prevented, and thus the degradation of heat resistance of the sealant layer 16 is reduced, and excess sealed portions are reduced. When the content of the component (A) is 95 mass % or less, 5 mass % or more component (B) is permitted to be contained, and thus the effect of improving degassing and heat sealing strength by the component (B) is sufficiently obtained.

(Polyolefin Elastomer (B) Including 1-Butene as Comonomer and Having Melting Point of 150° C. or Less)

The polyolefin elastomer (B) including 1-butene as a comonomer and having a melting point of 150° C. or less contributes to improving the sealing properties, including degassing and heat sealing strength, in relation to the electrolytic solution, and to reducing the occurrence of whitening due to forming.

The polyolefin elastomer (B) may have or may not have miscibility with the component (A), but may preferably contain both of a polyolefin elastomer (B-1) having miscibility and a polyolefin elastomer (B-2) having no miscibility. Having miscibility with the component (A) (being miscible) refers to that the polyolefin elastomer (B) is dispersed in the propylene-ethylene random copolymer resin configuring the component (A), with a dispersed phase size of 1 nm or more and less than 500 nm. Having no miscibility with the component (A) (being immiscible) refers to that the polyolefin elastomer (B) is dispersed in the propylene-ethylene random copolymer resin configuring the component (A), with a dispersed phase size of 500 nm or more and less than 20 μm.

The miscible-type polyolefin elastomer (B-1) may be, for example, a propylene-1-butene random copolymer.

The immiscible-type polyolefin elastomer (B-2) may be, for example, an ethylene-1-butene random copolymer.

The melting point of the polyolefin elastomer (B) is required to be 150° C. or less. However, from the viewpoint of decreasing excess sealed portions, preventing whitening during forming, and improving the sealing properties in relation to the electrolytic solution, the melting point is preferably in the range of 60 to 120° C., and more preferably in the range of 65 to 90° C. The melting point being 150° C. or less can lead to improving the sealing properties, or specifically the degassing and heat sealing strength, in relation to the electrolytic solution. The melting point being 60° C. or more is advantageous from the viewpoint of reducing excess sealed portions.

Such polyolefin elastomers (B) can be used alone or in combination of two or more.

In the resin composition for forming the sealant layer, the content of the component (B) is in the range of 5 to 40 mass %, preferably in the range of 10 to 40 mass %, and more preferably in the range of 15 to 40 mass %, relative to the total of the solid content of the resin composition. When the content of the component (B) is 5 mass % or more, the sealing properties in relation to the electrolytic solution, specifically the effect of improving degassing and heat sealing strength can be sufficiently obtained. When the content of the component (B) is 40 mass % or less, degradation of heat resistance of the sealant layer 16 can be reduced, and excess sealed portions can be reduced.

When the component (B) contains the miscible-type polyolefin elastomer (B-1) and the immiscible-type polyolefin elastomer (B-2), the content ratio of the elastomers (miscible-type polyolefin elastomer (B-1)/immiscible-type polyolefin elastomer (B-2)) is preferably in the range of 0.5 to 3, and more preferably in the range of 1 to 2, in terms of mass ratio. By setting the content ratio to the above ranges, resistance to whitening due to forming and sealing properties in relation to the electrolytic solution can be improved with good balance.

(Additive Component)

The resin composition for forming the sealant layer may further contain components other than the components (A) and (B) described above. Other resins, such as low-density polyethylene (LDPE), may be added as components other than the components (A) and (B) to improve drawability, processability, or the like. The content of other resin components to be added is preferably 10 mass % or less relative to the total solid content of the resin composition. Examples of the components other than resins include a slip agent, an anti-blocking agent, an antioxidant, a light stabilizer, and a fire retardant. The content of the components other than resins is preferably 5 mass % or less relative to the total solid content of the resin composition.

The thickness of the sealant layer 16 is not limited specifically. However, specifically, the thickness is preferably in the range of 5 to 100 μm, and more preferably in the range of 10 to 60 μm, for example.

The presence of 1-butene in the sealant layer 16 can be confirmed from the identification using a Fourier-transform infrared spectrophotometer (FT-IR). The content of 1-butene can be confirmed by creating an analytical curve of the transmittance or absorbance in the characteristic absorption bands of the components (A) and (B), and using a resin composition that is formulated by using a known amount of elastomer containing a known amount of 1-butene. The content of 1-butene in the miscible-type polyolefin elastomer (B-1) and the immiscible-type polyolefin elastomer (B-2) can each be similarly confirmed by performing imaging in the characteristic absorption band of the FT-IR, and then performing mapping in an absorption band ascribed to 1-butene by FT-IR microscopy (transmission method). Other than FT-IR, the presence and content of 1-butene can also be confirmed by dissolving the sealant layer 16 with a solvent, and measuring the NMR.

(Sealant Layer According to Second Aspect)

A sealant layer 16 according to a second aspect includes a layer made of a resin composition containing: 60 to 95 mass % propylene-ethylene random copolymer (A); and a total of 5 to 40 mass % miscible-type elastomer (B') having miscibility with the propylene-ethylene random copolymer (A) and/or an elastomer (C) having no miscibility with the propylene-ethylene random copolymer (A). In the resin composition, the content of the immiscible-type elastomer (C) relative to the content of the miscible-type elastomer (B') in terms of mass ratio is in the range of 0 to 1. The miscible-type elastomer (B') and the immiscible-type elastomer (C) have a common comonomer component. In the following, the components will be individually described.

(Propylene-Ethylene Random Copolymer (A))

The propylene-ethylene random copolymer (A) has good heat-sealing properties at low temperature, compared with a propylene-ethylene block copolymer and a propylene homopolymer, and can improve sealing properties in relation to the electrolytic solution. The propylene-ethylene random copolymer (A), which has low crystallizability, can prevent a change in the volume due to thermal shrinkage, can reduce the occurrence of cracks, and can improve insulation properties after forming.

In the propylene-ethylene random copolymer (A), the content of ethylene is preferably in the range of 0.1 to 10 mass %, more preferably in the range of 1 to 7 mass %, and more preferably in the range of 2 to 5 mass %. When the content of ethylene is 0.1 mass % or more, the effect of decreasing the melting point by copolymerizing ethylene is likely to be sufficiently obtained, and the sealing properties in relation to the electrolytic solution are likely to be further improved. When the content of ethylene is 10 mass % or less, excessive lowering of the melting point is likely to be prevented, and heat sealing (excess sealed portions) other than in the portions to be sealed is likely to be more sufficiently reduced. The content of ethylene can be measured using infrared absorption spectrometry (IR spectrometry), nuclear magnetic resonance absorption ($^{13}$C-NMR or $^{1}$H-NMR), or the like.

The melting point of the propylene-ethylene random copolymer (A) is preferably in the range of 120 to 145° C., and more preferably in the range of 125 to 140° C. When the melting point is 120° C. or more, excess sealed portions are likely to be further reduced. When the melting point is 145° C. or less, the sealing properties in relation to the electrolytic solution are likely to be further improved.

It is preferred that the weight average molecular weight of the propylene-ethylene random copolymer (A) is appropriately adjusted so that the melting point is in the above ranges, and thus is preferably in the range of 10,000 to 10,000,000, and more preferably in the range of 100,000 to 1,000,000.

The propylene-ethylene random copolymer (A) may be an acid-modified copolymer, and thus may be, for example, an acid-modified propylene-ethylene random copolymer graft-modified by a maleic anhydride. Using the acid-modified propylene-ethylene random copolymer, adhesion to tab leads is retained in the absence of a tab sealant.

Such propylene-ethylene random copolymers (A) can be used alone or in combination of two or more.

In the resin composition for forming the sealant layer, the content of the component (A) may be in the range of 60 to 95 mass % relative to the total solid content of the resin composition, preferably in the range of 70 to 90 mass %, and more preferably in the range of 70 to 85 mass %. When the content of the component (A) is 60 mass % or more, sealing properties in relation to the electrolytic solution can be improved by the effect (related to melting point and crystallinity) of using the component (A). When the content of the component (A) is 60 mass % or more, the component (B') and/or the component (C) are prevented from being excessively present, leading to preventing degradation of heat resistance of the sealant layer, and preventing swelling of the electrolytic solution. When the content of the component (A) is 95 mass % or less, the component (B') and/or the component (C) is permitted to be contained by 5 mass % or more in total, and the effect of improving degassing and heat sealing strength by the component (B') and/or the component (C) can be obtained.

(Miscible-Type Elastomer (B'))

The miscible-type elastomer (B') reduces occurrence of cracks, and contributes to the improvement of insulation properties after forming.

The miscible-type elastomer (B') has miscibility with the component (A). Having miscibility with the component (A) (being miscible) refers to that the miscible-type elastomer (B') is dispersed in the propylene-ethylene random copolymer resin forming the component (A) with a dispersed phase size of 1 nm or more and less than 500 nm. Having no miscibility with the component (A) (being immiscible) refers to that the miscible-type elastomer (B') is dispersed in the propylene-ethylene random copolymer resin forming the component (A), with a dispersed phase size of 500 nm or more and less than 20 µm.

Examples of the miscible-type elastomer (B') include a propylene elastomer, hydrogenated styrene elastomer, and ethylene-α-olefin elastomer (with a large α-olefin carbon number and a high content of α-olefin). In the ethylene-α-olefin elastomer, the α-olefin carbon number is 4 or more, for example, and the content of α-olefin is 35 mol % or more, for example. Of the elastomers, a propylene elastomer and a hydrogenated styrene elastomer are preferable from the viewpoint of having a good affinity for the component (A). Examples of the propylene elastomer include Tafmer, which is a propylene-1-butene random copolymer (manufactured by Mitsui Chemicals Inc.) and NOTIO, which is a nano-crystal structure controlled elastomer (manufactured by Mitsui Chemicals Inc.). Examples of the hydrogenated styrene elastomer include Tuftec (manufactured by Asahi Kasei Corporation). Such miscible elastomers (B') can be used alone or in combination of two or more.

From the viewpoint of improving insulation properties after forming, the melting point of the miscible-type elastomer (B') is preferably 130° C. or less, more preferably in the range of 60 to 120° C., and still more preferably in the range of 65 to 90° C. When the melting point is 130° C. or less, the sealing properties in relation to the electrolytic solution, specifically the degassing and heat sealing properties, can be further improved. The melting point being 60° C. or more is advantageous from the viewpoint of reducing the occurrence of cracks and further improving insulation properties after forming.

(Immiscible-Type Elastomer (C))

The immiscible-type elastomer (C) contributes to improving sealing properties, including degassing and heat sealing strength, in relation to the electrolytic solution.

The immiscible-type elastomer (C) has no miscibility with the component (A). Having no miscibility with the component (A) (being immiscible) refers to that the immiscible-type elastomer (C) is dispersed in the propylene-ethylene random copolymer resin forming the component (A), with a dispersed phase size of 500 nm or more and less than 20 µm.

Examples of the immiscible-type elastomer (C) include a styrene elastomer, an ethylene elastomer, a vinyl chloride elastomer, a urethane elastomer, and an amide elastomer. Of these elastomers, an ethylene-1-butene random copolymer and a styrene elastomer are preferable from the viewpoint of having a good affinity for the component (B'). The ethylene-1-butene random copolymer (e.g. EXCELLEN (manufactured by Sumitomo Chemical Co., Ltd.)) is preferable because swelling due to the electrolytic solution is less prone to occur. Such immiscible elastomers (C) can be used alone or in combination of two or more.

From the viewpoint of improving insulation properties after forming and sealing properties in relation to the electrolytic solution, the melting point of the immiscible-type elastomer (C) is preferably 130° C. or less, more preferably in the range of 60 to 120° C., and still more preferably in the range of 65 to 90° C. When the melting point is 130° C. or less, sealing properties, including specifically the degassing and heat sealing strength, in relation to the electrolytic solution can be further improved. The melting point being 60° C. or more is advantageous from the viewpoint of reducing occurrence of cracks and further improving insulation properties after forming.

In the resin composition for forming the sealant layer, the content of the miscible-type elastomer (B') and/or the immiscible-type elastomer (C) in total is in the range of 5 to 40 mass %, preferably in the range of 10 to 40 mass %, and more preferably in the range of 15 to 40 mass %, relative to the total solid content of the resin composition. When the content of the component (B') and/or the component (C) in total is 5 mass % or more, occurrence of cracks is reduced, and insulation properties after forming can be improved. The content of the component (B') and/or the component (C) in total being 40 mass % or less can prevent degradation in heat resistance of the sealant layer 16, in sealing strength due to the swelled electrolytic solution, and in degassing and heat sealing strength.

The content of the immiscible-type elastomer (C) relative to the miscible-type elastomer (B') (immiscible-type elastomer (C)/miscible-type elastomer (B')) in terms of mass ratio may be in the range of 0 to 1, preferably in the range of 0.3 to 1, and more preferably in the range of 0.5 to 1. By permitting the content in terms of mass ratio to fall in the above ranges, occurrence of cracks is reduced, insulation properties after forming are improved, and degassing and heat sealing strength is further improved.

In the resin composition for forming the sealant layer, the miscible-type elastomer (B') and the immiscible-type elastomer (C) have a common comonomer component. From the viewpoint of having a good affinity for the component (A) and further improving the affinity in the interfaces of the sea-island structure, a combination of the components (B') and (C) is preferably one in which the miscible-type elastomer (B') is a propylene-1-butene random copolymer and the immiscible-type elastomer (C) is an ethylene-1-butene random copolymer. In this case, the common comonomer component is 1-butene. From a similar viewpoint and the viewpoint of mitigating stress caused such as by forming, the miscible-type elastomer (B') is preferably a hydrogenated styrene elastomer, and the immiscible-type elastomer (C) is a styrene elastomer. In this case, the common comonomer component is styrene.

In the sealant layer 16, the presence of the comonomer component, such as 1-butene and styrene, can be confirmed from the identification using a Fourier-transform infrared spectrophotometer (FT-IR). The content of the comonomer component can be confirmed by creating an analytical curve of the transmittance or absorbance in the characteristic absorption bands of the component (A) and the component (B'), using a resin composition that is formulated by using a known amount of elastomer containing a known amount of comonomer component. The content of the comonomer component in the miscible-type elastomer (B') and the immiscible-type elastomer (C) can be similarly confirmed by performing imaging in the characteristic absorption band of the FT-IR, and then performing mapping in an absorption band ascribed to comonomer by microscopic FT-IR (transmission method). Other than FT-IR, the presence and content of comonomer can also be confirmed by dissolving the sealant layer 16 with a solvent, and measuring NMR.

(Additive Component)

The resin composition for forming the sealant layer may further contain a component other than the components (A), (B') and (C) described above. Other resins, such as low-density polyethylene (LDPE), may be added as the component other than the components (A), (B') and (C) include to improve drawability and processability, for example. The content of other resin components to be added is preferably 10 mass % or less relative to the total solid content of the resin composition. Examples of the component other than resins include a slip agent, an anti-blocking agent, an antioxidant, a light stabilizer, and a fire retardant. The content of the component other than resins is preferably 5 mass % or less relative to the total solid content of the resin composition.

The thickness of the sealant layer 16 is not limited specifically. However, specifically, the thickness is preferably in the range of 5 to 100 μm, and more preferably in the range of 10 to 60 μm, for example.

A preferred embodiment of the power storage device packaging material according to the present invention has so far been described in detail. However, the present invention is not limited to such a specific embodiment, but may be variously altered and modified within the spirit of the present invention recited in the claims.

Although FIG. 1 shows the case in which the anti-corrosion treatment layer 14 is formed on a surface of the metal foil layer 13 on the adhesive resin layer 15 side, the anti-corrosion treatment layer 14 may be formed on a surface of the metal foil layer 13 on the first adhesive layer 12 side, or may be formed on both surfaces of the metal foil layer 13. When the anti-corrosion treatment layer 14 is formed on both surfaces of the metal foil layer 13, the configuration of the anti-corrosion treatment layer 14 formed on the metal foil layer 13 on the first adhesive layer 12 side may be the same as or different from the configuration of the anti-corrosion treatment layer 14 formed on the surface of the metal foil layer 13 on the adhesive resin layer 15 side.

Figure 2:
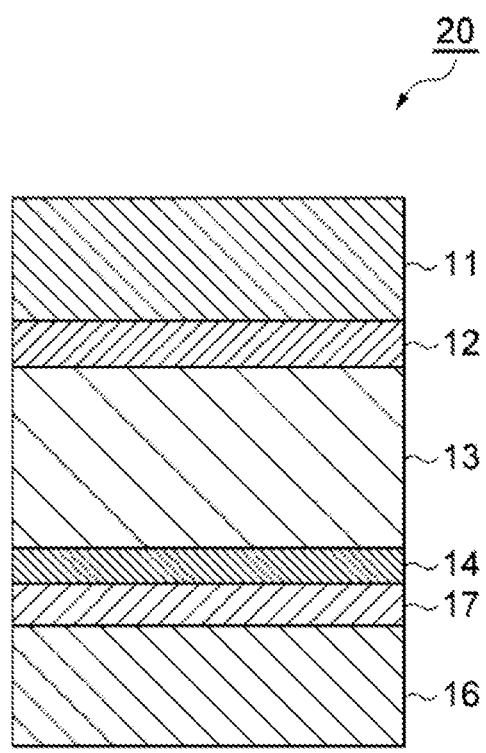
FIG. 2 is a schematic cross-sectional view showing a packaging material for a power storage device according to an embodiment of the present invention.

Although FIG. 1 shows the case in which the metal foil layer 13 is laminated with the sealant layer 16 using the adhesive resin layer 15, the metal foil layer 13 may be laminated with the sealant layer 16 using a second adhesive layer 17, as in a packaging material for a power storage device 20 shown in FIG. 2. The following description addresses the second adhesive layer 17.

<Second Adhesive Layer 17>

The second adhesive layer 17 bonds the metal foil layer 13 formed with the anti-corrosion treatment layer 14 to the sealant layer 16. A typical adhesive used for bonding a metal foil layer to a sealant layer may be used as the second adhesive layer 17.

When the anti-corrosion treatment layer 14 includes a layer containing at least one polymer selected from the group consisting of cationic polymers and anionic polymers mentioned above, the second adhesive layer 17 preferably contains a compound having reactivity with the polymer contained in the anti-corrosion treatment layer 14 (hereinafter, this compound is also referred to as a reactive compound).

For example, when the anti-corrosion treatment layer 14 contains a cationic polymer, the second adhesive layer 17 may contain a compound having reactivity with a cationic polymer. When the anti-corrosion treatment layer 14 contains an anionic polymer, the second adhesive layer 17 may contain a compound having reactivity with an anionic polymer. When the anti-corrosion treatment layer 14 contains a cationic polymer and an anionic polymer, the second adhesive layer 17 may contain a compound having reactivity with a cationic polymer and a compound having reactivity with an anionic polymer. However, the second adhesive layer 17 does not necessarily have to contain the two types of compounds, but may contain a compound having reactivity with both a cationic polymer and an anionic polymer. The term "having reactivity" refers to forming a covalent bond with a cationic polymer or an anionic polymer. The second adhesive layer 17 may further contain an acid-modified polyolefin resin.

The compound having reactivity with a cationic polymer may be at least one compound selected from the group consisting of a polyfunctional isocyanate compound, a glycidyl compound, a compound having a carboxy group, and a compound having an oxazoline group.

Examples of the polyfunctional isocyanate compound, glycidyl compound, the compound having a carboxy group, and the compound having an oxazoline group include a polyfunctional isocyanate compound, a glycidyl compound, a compound having a carboxy group, and a compound having an oxazoline group, mentioned as a crosslinker to form the cationic polymer into a cross-linked structure. Of these compounds, a polyfunctional isocyanate compound is preferable from the viewpoint of having high reactivity with a cationic polymer and easily forming a cross-linked structure.

The compound having reactivity with an anionic polymer may be at least one compound selected from the group consisting of a glycidyl compound and a compound having an oxazoline group. Examples of the glycidyl compound and the compound having an oxazoline group include a glycidyl compound and a compound having an oxazoline group exemplified above as a crosslinker to form a cationic polymer into a cross-linked structure. Of these compounds, a glycidyl compound is preferable from the viewpoint of having high reactivity with an anionic polymer.

When the second adhesive layer 17 contains an acid-modified polyolefin resin, the reactive compound preferably also has reactivity with an acidic group in the acid-modified polyolefin resin (i.e. forms a covalent bond with the acidic group). Thus, the adhesion to the anti-corrosion treatment layer 14 is further enhanced. In addition, since the acid-modified polyolefin resin is formed into a cross-linked structure, the solvent resistance of the packaging material 20 is further improved.

The content of the reactive compound is preferably from an equivalent to 10 times equivalent relative to an acidic group in the acid-modified polyolefin resin. When the content is an equivalent or more, the reactive compound sufficiently reacts with the acidic group in the acid-modified polyolefin resin. When the content exceeds 10 times equivalent, the crosslinking reaction with the acid-modified polyolefin resin is sufficiently saturated, leaving unreacted substances, and there is a risk of degradation of various properties.

The acid-modified polyolefin resin is obtained by introducing an acidic group into a polyolefin resin. The acidic group may be a carboxy group, a sulfonic group, or the like, among which a carboxy group is specifically preferable. The acid-modified polyolefin resins that can be used include similar ones exemplified as the modified polyolefin resin (a) used for the adhesive resin layer 15.

The second adhesive layer 17 may be formulated using various additives, such as a fire retardant, a slip agent, an anti-blocking agent, an antioxidant, a light stabilizer, and a tackifier.

Typical adhesives used for bonding a metal foil layer to a sealant layer may contain a silane coupling agent. This is because formulation of such a typical adhesive using a silane coupling agent can promote adhesion and enhance adhesive strength. However, when an adhesive formulated by using a silane coupling agent is used, a component other than the silane coupling agent contained in the adhesive layer may cause a side reaction with the silane coupling agent, depending on the type of the functional group contained in the silane coupling agent, and the side reaction may adversely affect a crosslinking reaction that is an original purpose. Thus, the adhesive used for bonding a metal foil layer to a sealant layer preferably contains no silane coupling agent.

When the second adhesive layer 17 contains a reactive compound mentioned above, the reactive compound forms a covalent bond with the polymer in the anti-corrosion treatment layer 14 to improve adhesion strength between the anti-corrosion treatment layer 14 and the second adhesive layer 17. Consequently, the second adhesive layer 17 does not need to be formulated using a silane coupling agent to promote adhesion, or preferably contains no silane coupling agent.

The thickness of the second adhesive layer 17 is not limited specifically. However, from the viewpoint of obtaining a desired adhesive strength, processability, and the like, the thickness of the second adhesive layer 17 is preferably in the range of 1 to 10 μm, and more preferably in the range of 3 to 7 μm.

Except for the second adhesive layer 17, the configuration of the packaging material 20 for a power storage device is similar to the packaging material 10 for a power storage device. The thickness of the sealant layer 16 in the packaging material 20 for a power storage device is adjusted according to the thickness of the second adhesive layer 17. The thickness of the sealant layer 16 in the packaging material 20 for a power storage device is not limited specifically, but may preferably be in the range of 5 to 100 μm, more preferably in the range of 10 to 80 μm, and more preferably in the range of 20 to 80 μm.

Although FIG. 1 and FIG. 2 show the case in which the sealant layer 16 is formed of a single layer, the sealant layer 16 may be formed as a multi-layer having two or more layers. The layers in the multi-layer of the sealant layer 16 may be may have the same configuration or a different configuration.

When the sealant layer is formed as a multi-layer in the second aspect, in the multi-layer forming the sealant layer, a surface, as a main surface, of a layer on a side opposite to the second adhesive layer or the adhesive resin layer of the sealant layer (innermost layer of the sealant layer), i.e. a layer farthest from the second adhesive layer or the adhesive resin layer in the multi-layer forming the sealant layer, is preferably formed of a resin composition containing the propylene-ethylene random copolymer (A) but containing neither the miscible-type elastomer (B') nor the immiscible-type elastomer (C), or a resin composition containing the propylene-ethylene random copolymer (A) and the miscible-type elastomer (B') but containing no immiscible-type elastomer (C). In this case, the occurrence of cracks in cold forming is further reduced in the innermost layer of the sealant layer, and thus penetration of the electrolytic solution into the metal foil layer is further reduced, and accordingly, insulation properties after forming are further improved. In the resin composition used for the innermost layer of the sealant layer having the multi-layer structure, the same elastomers mentioned above can be used for the propylene-ethylene random copolymer (A), the miscible-type elastomer (B'), and the immiscible-type elastomer (C).

Figure 3:
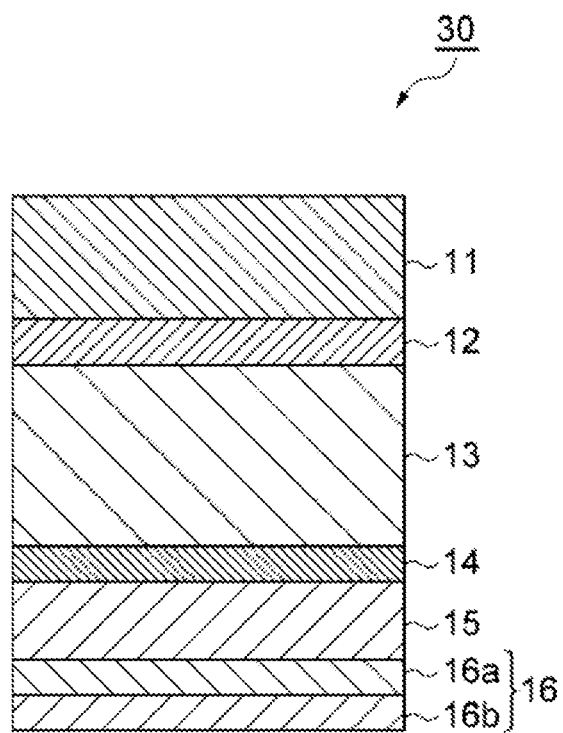
FIG. 3 is a schematic cross-sectional view showing a packaging material for a power storage device according to an embodiment of the present invention.

When the sealant layer 16 is formed of two layers, as in a packaging material 30 for a power storage device shown in FIG. 3, the sealant layer 16 includes a metal foil layer 13 side first sealant layer 16a, and a second sealant layer 16b, which is the innermost layer of the sealant layer 16.

In the packaging material for a power storage device 30 according to the second aspect, the first sealant layer 16a is preferably formed of a resin composition containing 60 to 95 mass % propylene-ethylene random copolymer (A) and 5 to 40 mass % miscible-type elastomer (B') and/or immiscible-type elastomer (C) in total, from the viewpoint of further improving heat sealing properties, including insulation properties after forming and the degassing and heat sealing strength, in relation to the electrolytic solution. From the same viewpoint, the content of the immiscible-type elastomer (C) relative to the content of the miscible-type elastomer (B') in the resin composition is preferably in the range of 0 to 1 in terms of mass ratio, and the miscible-type elastomer (B') and the immiscible-type elastomer (C) preferably have a common comonomer component. In this case, from the viewpoint of further improving heat sealing properties in relation to the electrolytic solution, the content of the immiscible-type elastomer (C) relative to the content of the miscible-type elastomer (B') in terms of mass ratio in the resin composition used for the first sealant layer 16a is more preferably in the range of 0.3 to 1, and still more preferably in the range of 0.5 to 1.

In the packaging material 30 for a power storage device according to the first aspect, the first sealant layer 16a is preferably formed of a resin composition containing 60 to 95 mass % propylene-ethylene random copolymer (A) and 5 to 40 mass % polyolefin elastomer (B) including 1-butene as a comonomer and having a melting point of 150° C. or less, from the viewpoint of further improving sealing properties, including degassing and heat sealing strength, in relation to the electrolytic solution and reducing excess sealed portions and occurrence of whitening due to forming.

Except for the first sealant layer 16a and the second sealant layer 16b, the packaging material 30 for a power storage device is configured similarly to the packaging material 10 for a power storage device. The thickness of the first sealant layer 16a or the second sealant layer 16b of the packaging material 30 for a power storage device is not specifically limited. However, from the viewpoint of improving insulation properties, the thickness of the second sealant layer 16b is preferably equal to or more than the thickness of the first sealant layer 16a.

Although FIGS. 1, 2, and 3 show the case in which the base material layer 11 is bonded to the metal foil layer 13 via the first adhesive layer 12, the base material layer 11 may be directly formed on the metal foil layer 13 by coating, without the first adhesive layer 12 being interposed therebetween. In the present specification, the base material layer directly formed on the metal foil layer 13 in this way by coating is referred to as a coating layer. The anti-corrosion treatment layer 14 may be formed on the coating layer side surface of the metal foil layer 13. The following description addresses the coating layer.

<Coating Layer>

The coating layer imparts heat resistance to the packaging material in the sealing process when manufacturing a power storage device, and reduces possible occurrence of pinholes during processing and distribution.

The coating layer is made of a resin, and directly formed on a surface of the metal foil layer 13 without being interposed by an adhesive or the like. Such a coating layer is formed by applying a resin material to be the coating layer to the metal foil layer 13.

The resin material for forming the coating layer may be a polyester, a fluorine resin, an acrylic resin, or the like, among which, urethane acrylate is preferable. This is because a coating film made of urethane acrylate has preferred ductility. A two-part curing system coating liquid may be used as a coating liquid that contains these resin materials.

The thickness of the coating layer is preferably in the range of 3 to 30 µm, and more preferably in the range of 5 to 20 µm. Since the coating layer is directly formed on the metal foil layer 13, the packaging material is easily configured to be thinner than a conventional one by forming the coating layer with a thickness of 20 µm or less.

[Method of Manufacturing Packaging Material]

The following description addresses a method of manufacturing the packaging material 10 shown in FIG. 1. The method of manufacturing the packaging material 10 is not limited to the following method.

The method of manufacturing the packaging material 10 of the present embodiment is roughly configured to include a step of laminating the anti-corrosion treatment layer 14 with the metal foil layer 13, a step of bonding the base material layer 11 to the metal foil layer 13, a step of further laminating the adhesive resin layer 15 and the sealant layer 16 to prepare a laminate, and a step of heat-treating the resultant laminate, as necessary.

(Step of Laminating Anti-Corrosion Treatment Layer 14 with Metal Foil Layer 13)

In the present step, the anti-corrosion treatment layer 14 is formed on the metal foil layer 13. In this method, degreasing treatment, hydrothermal modification treatment, anodic oxidation treatment, or chemical conversion treatment is applied to the metal foil layer 13, or a coating agent having anti-corrosion performance is applied to the metal foil layer 13, as described above.

When the anti-corrosion treatment layer 14 is a multi-layer, the following method may be used. In the method, for example, a coating liquid (coating agent) for forming a lower layer side (metal foil layer 13 side) anti-corrosion treatment layer is applied to the metal foil layer 13, followed by baking to form a first layer, and then a coating liquid (coating agent) for forming an upper layer side anti-corrosion treatment layer is applied to the first layer, followed by baking to form a second layer. The second layer can also be formed in the step of laminating the adhesive resin layer 15 and the sealant layer 16 described later.

Degreasing treatment may be performed by using spraying or immersion. Hydrothermal modification treatment and anodic oxidation treatment may be performed by immersion. Chemical conversion treatment may be performed by appropriately selecting immersion, spraying, or coating, depending on the types of chemical conversion treatment.

When applying the coating agent having anti-corrosion performance, various methods can be used, including gravure coating, reverse coating, roll coating, and bar coating.

As described above, various treatments can be applied to both of or one of the surfaces of the metal foil. In the case of treating one surface, treatment is preferably applied to the surface on which the adhesive resin layer 15 is laminated. The above treatments may be applied to the surfaces of the base material layer 11, as required.

The amount of coating of the coating agent for forming the first or second layer is preferably in the range of 0.005 to 0.200 $g/m^2$, and more preferably in the range of 0.010 to 0.100 $g/m^2$.

Dry curing, if needed, can be performed in the base-material temperature range of 60 to 300° C., according to the drying conditions for the anti-corrosion treatment layer 14 to be used.

(Step of Bonding Base Material Layer 11 to Metal Foil Layer 13)

In the present step, the metal foil layer 13, which is provided with the anti-corrosion treatment layer 14, is bonded to the base material layer 11 via the first adhesive layer 12. Using a bonding method, such as dry lamination, non-solvent lamination, or wet lamination, the base material layer 11 is bonded to the metal foil layer 13 with an above-mentioned material for forming the first adhesive layer 12. The first adhesive layer 12 is formed, with a dry coating amount in the range of 1 to 10 $g/m^2$, and more preferably in the range of 3 to 7 $g/m^2$.

(Step of Laminating Adhesive Resin Layer 15 and Sealant Layer 16)

In the present step, the adhesive resin layer 15 and the sealant layer 16 are formed on the anti-corrosion treatment layer 14 that has been formed in the previous step. The method may be one in which the adhesive resin layer 15 is sandwich-laminated together with the sealant layer 16, using an extrusion laminator. Tandem lamination or co-extrusion may also be used, in which the adhesive resin layer 15 and the sealant layer 16 are extruded and laminated.

In the present step, a laminate as shown in FIG. 1 is obtained, in which layers are laminated in the order of base material layer 11/first adhesive layer 12/metal foil layer 13/anti-corrosion treatment layer 14/adhesive resin layer 15/sealant layer 16.

The adhesive resin layer 15 may be formed by directly laminating materials that are dry-blended using an extrusion laminator, so as to be a composition formulated using the materials set forth above. Alternatively, materials may be melt-blended in advance using a melt kneader, such as a single-screw extruder, twin-screw extruder, or Brabender mixer, followed by granulation, and the granulated material may be laminated as the adhesive resin layer 15, using an extrusion laminator.

When the multi-layer anti-corrosion treatment layer 14 is formed, and if the extrusion laminator has a unit that can form an anchor coating layer, the second layer of the anti-corrosion treatment layer 14 may be coated using the unit.

(Heat Treatment Step)

In the present step, the laminate is heat-treated. The heat treatment has an effect of improving adhesion between metal foil layer 13/anti-corrosion treatment layer 14/adhesive resin layer 15/sealant layer 16 and imparting better electrolytic solution resistance and hydrogen fluoride resistance, and also an effect of controlling crystallization of the adhesive resin layer 15 and the sealant layer 16 and improving insulation properties after forming. Thus, it is preferred that the heat treatment performed in the present step is one that improves adhesion between the layers and is appropriate for the crystallizing the adhesive resin layer 15 and the sealant layer 16.

In this way, the packaging material 10 of the present embodiment as shown in FIG. 1 can be produced.

An example of a method of manufacturing the packaging material 20 shown in FIG. 2 will be described. The method of manufacturing the packaging material 20 is not limited to the following method.

The method of manufacturing the packaging material 20 of the present embodiment includes a step of laminating the anti-corrosion treatment layer 14 on the metal foil layer 13, a step of bonding the base material layer 11 to the metal foil layer 13, a step of further laminating the sealant layer 16 via the second adhesive layer 17 to prepare a laminate, and a step of aging the resultant laminate, as necessary. The steps at or prior to the step of bonding the base material layer 11 to the metal foil layer 13 are performed similarly to the method of manufacturing the packaging material 10.

(Step of Laminating Second Adhesive Layer 17 and Sealant Layer 16)

In the present step, the sealant layer 16 is bonded to a surface of the metal foil layer 13 on a side facing the anti-corrosion treatment layer 14 via the second adhesive layer 17. The bonding method may be wet processing, dry lamination, or the like.

In the case of wet processing, a liquid solution or fluid dispersion of an adhesive for forming the second adhesive layer 17 is applied onto the anti-corrosion treatment layer 14, and the solvent is evaporated at a predetermined temperature (when the adhesive includes an acid-modified polyolefin resin, the evaporation temperature is not less than its melting point), followed by baking. After that, the sealant layer 16 is laminated, to thereby produce the packaging material 20. The coating method may be those which mentioned above.

(Aging Treatment Step)

In the present step, the laminate is aged. By aging the laminate, adhesion is promoted between metal foil layer 13/anti-corrosion treatment layer 14/second adhesive layer 17/sealant layer 16. The aging treatment is performed at a temperature in the range of ambient temperature to 100° C. The aging time, for example, is 1 to 10 days.

In this way, the packaging material 20 of the present embodiment as shown in FIG. 2 is manufactured.

An example of a method of manufacturing the packaging material 30 shown in FIG. 3 will be described. The method of manufacturing the packaging material 30 is not limited to the following method.

The method of manufacturing the packaging material 30 of the present embodiment includes a step of laminating the anti-corrosion treatment layer 14 on the metal foil layer 13, a step of bonding the base material layer 11 to the metal foil layer 13, a step of further laminating the adhesive resin layer 15, the first sealant layer 16a, and the second sealant layer 16b to prepare a laminate, and a step of heat-treating the resultant laminate, as necessary.

(Step of Laminating Adhesive Resin Layer 15, First Sealant Layer 16a, and Second Sealant Layer 16b)

In the present step, the adhesive resin layer 15, the first sealant layer 16a, and the second sealant layer 16b are formed on the anti-corrosion treatment layer 14. The method may be tandem lamination or co-extrusion, in which the adhesive resin layer 15, the first sealant layer 16a, and the second sealant layer 16b are extruded using an extrusion laminator.

In this way, the packaging material 30 of the present embodiment as shown in FIG. 3 is produced.

Some preferred embodiments of the packaging material for a power storage device and the manufacturing method according to the present invention have so far been described in detail. However, the present invention is not limited to such specific embodiments. The present invention may be variously modified or altered within the spirit of the present invention recited in the claims. It should be noted that, in the case of manufacturing the packaging material for a power storage device including a coating layer instead of the base material layer 11 and the first adhesive layer 12, the coating layer can be formed, as described above, by applying a resin material to serve as the coating layer on the metal foil layer 13.

The packaging material for a power storage device according to the present invention are favorably used for the packaging materials for power storage devices, including secondary batteries, such as lithium ion batteries, nickel hydrogen batteries, and lead batteries, and electrochemical capacitors, such as an electric double layer capacitor. The packaging material for a power storage device according to the present invention is particularly favorable for packaging materials for lithium ion batteries.

EXAMPLES

In the following, the present invention will be described more in detail based on examples. However, the present invention is not limited to the following examples.

First, examples according to the first aspect and comparative examples are set forth below.

[Materials Used]

Materials used in Examples 1-1 to 1-8 and Comparative Examples 1-1 to 1-5 are set forth below.

<Base Material Layer (25 μm Thickness)>

A co-extruded multi-layer stretched film of a polyethylene terephthalate (PET) film and a nylon (Ny) film (manufactured by Gunze Limited) was used.

<First Adhesive Layer (4 μm Thickness)>

A polyurethane adhesive (manufactured by Toyo Ink Co., Ltd.) containing a polyester polyol base resin formulated using a tolylene diisocyanate adduct curing agent was used.

<First Anti-Corrosion Treatment Layer (Base Material Layer Side)>

(CL-1-1): "Sodium polyphosphate-stabilized cerium oxide sol" adjusted to have a solid concentration of 10 mass % using distilled water as a solvent was used. the sodium polyphosphate-stabilized cerium oxide sol was prepared by blending 10 parts by mass phosphate into 100 parts by mass cerium oxide.

(CL-1-2): Composition of 90 mass % "ammonium salt (manufactured by Toagosei Co., Ltd.)" and 10 mass % "acrylic-isopropylenyl oxazoline copolymer (manufactured by Nippon Shokubai Co., Ltd.)" adjusted to have a solid concentration of 5 wt % using distilled water as a solvent was used.

<Metal Foil Layer (40 μm Thickness)>

Annealed and degreased soft aluminum foil ("8079" manufactured by Toyo Aluminum K.K.) was used.

<Second Anti-Corrosion Treatment Layer (Sealant Layer Side)>

(CL-1-1): "Sodium polyphosphate-stabilized cerium oxide sol" adjusted to have a solid concentration of 10 wt % using distilled water as a solvent was used. The sodium polyphosphate-stabilized cerium oxide sol was prepared by blending 10 parts by mass phosphate into 100 parts by mass cerium oxide.

(CL-1-3): Composition of 90 wt % "polyallylamine (Nitto Boseki Co., Ltd.)" and 10 wt % "polyglycerol polyglycidyl ether (Nagase Chemtex Corp.)" adjusted to have a solid concentration of 5 wt % using distilled water as a solvent was used.

<Adhesive Resin Layer (15 μm Thickness)>

The following materials were mixed at a mass ratio of AR-1:AR-2:AR-3=3:1:1 and used.

(AR-1): Acid-modified polypropylene resin composition (manufactured by Mitsui Chemicals Inc.) of a random polypropylene (PP) base formulated using ethylene-propylene rubber as an immiscible-type rubber was used.

(AR-2): Propylene-α-olefin copolymer with an atactic structure ("Tafthren H" manufactured by Sumitomo Chemical Co., Ltd.) was used.

(AR-3): Propylene-α-olefin copolymer with an isotactic structure ("Tafmer XM" manufactured by Mitsui Chemicals Inc.) was used.

<Second Adhesive Layer (5 μm Thickness)>

An adhesive prepared by blending 10 parts by mass polyisocyanate compound with an isocyanurate structure (at a solid content ratio), into 100 parts by mass maleic anhydride modified polyolefin resin dissolved in toluene was used.

<Sealant Layer>

Resin compositions obtained by mixing components (SL-1-1 to SL-1-12) shown in Table 1 below at a compounding ratio (unit:part by mass) shown in Table 1 were used. Details of the components are shown below.

Component (A) (random PP): Propylene-ethylene random copolymer having a melting point of 140° C. ("Prime Polypro" manufactured by Prime Polymer Co., Ltd.).

Component (B-1) (propylene-1-butene): Propylene-1-butene random copolymer elastomer having miscibility with the component (A) and having a melting point of 85° C. ("Tafmer XM" manufactured by Mitsui Chemicals Inc.).

Component (B-2) (ethylene-1-butene): Ethylene-1-butene random copolymer elastomer having no miscibility with the component (A) and having a melting point of 75° C. ("EXCELLEN" manufactured by Sumitomo Chemical Co., Ltd.).

Hydrogenated styrene rubber: Hydrogenated styrene thermoplastic elastomer having miscibility with the component (A) ("Tuftec" manufactured by Asahi Kasei Corporation).

Ethylene-propylene: Ethylene-propylene copolymer elastomer having no miscibility with the component (A) ("Tafmer A" manufactured by Mitsui Chemicals Inc.,).

TABLE 1

| | | Component (B) | | Other elastomers | |
|---|---|---|---|---|---|
| | Component (A) Random PP | Miscible elastomer (B-1) Propylene-butene-1 | Immiscible elastomer (B-2) Ethylene-butene-1 | Miscible elastomer Hydrogenated styrene rubber | Immiscible elastomer Ethylene-propylene |
| SL-1-1 | 70 | 20 | 10 | — | — |
| SL-1-2 | 80 | 10 | 10 | — | — |
| SL-1-3 | 90 | 5 | 5 | — | — |
| SL-1-4 | 85 | 10 | 5 | — | — |
| SL-1-5 | 85 | 5 | 10 | — | — |
| SL-1-6 | 80 | 20 | — | — | — |
| SL-1-7 | 90 | — | 10 | — | — |
| SL-1-8 | 80 | — | — | 20 | — |
| SL-1-9 | 90 | — | — | — | 10 |
| SL-1-10 | 55 | 35 | 10 | — | — |
| SL-1-11 | 100 | — | — | — | — |
| SL-1-12 | 97 | 3 | — | — | — |

Example 1-1

First, a first anti-corrosion treatment layer was provided to a metal foil layer according to the following procedure. That is, (CL-1-1) was applied to a surface of the metal foil layer by micro gravure coating with a dry coating amount of 70 mg/m², followed by baking in a drying unit at 200° C. Subsequently, (CL-1-2) was applied to the resultant layer by micro gravure coating with a dry coating amount of 20 mg/m², thereby forming a composite layer made of (CL-1-1) and (CL-1-2) as a first anti-corrosion treatment layer. This composite layer was allowed to express anti-corrosion performance by complexing the two materials, i.e. by complexing (CL-1-1) with (CL-1-2).

Subsequently, (CL-1-1) was applied to the other surface of the metal foil layer by micro gravure coating with a dry coating amount of 70 mg/m², followed by baking in a drying unit at 200° C. Subsequently, (CL-1-3) was applied to the resultant layer by micro gravure coating with a dry coating amount of 20 mg/m², thereby forming a composite layer made of (CL-1-1) and (CL-1-3) as a second anti-corrosion treatment layer. This composite layer was allowed to express anti-corrosion performance by complexing the two materials, i.e. by complexing (CL-1-1) with (CL-1-3)

Subsequently, the metal foil layer was bonded by dry lamination to the base material layer via the first anti-corrosion treatment layer-side surface on which the first and second anti-corrosion treatment layers were provided, using a polyurethane adhesive (first adhesive layer). The resultant object was set on the unwinding unit of an extrusion laminator, followed by co-extrusion of compounds onto the second anti-corrosion treatment layer under conditions of 290° C. and 100 m/min, to provide lamination in the order of an adhesive resin layer (15 μm thickness) and a sealant layer (30 μm thickness). For the adhesive resin layer and the sealant layer, compounds of various materials were prepared in advance using a twin-screw extruder, followed by water cooling and pelletization, for use in the above extrusion lamination. The resin composition (SL-1-1) was used for forming the sealant layer.

The laminate thus obtained was heat-treated by thermal lamination so that the maximum attainable temperature would be 190° C., to thereby prepare a packaging material of Example 1-1 (laminate of base material layer/first adhesive layer/first anti-corrosion treatment layer/metal foil layer/second anti-corrosion treatment layer/adhesive resin layer/sealant layer).

Examples 1-2 to 1-7

Except that the resin compositions used for forming the sealant layer were changed to (SL-1-2) to (SL-1-7) (all 30 μm thickness), packaging materials of Examples 1-2 to 1-7 were produced similarly to Example 1-1.

Example 1-8

Similarly to Example 1-1, a laminate of base material layer/first adhesive layer/first anti-corrosion treatment layer/metal foil layer/second anti-corrosion treatment layer was prepared. Subsequently, an adhesive (second adhesive layer) was applied to the second anti-corrosion treatment layer by dry lamination with a dry coating amount of 4 to 5 g/m², followed by drying for formation into a film, and then a sealant layer was bonded. The resin composition (SL-1-1) was formed into a film with a thickness of 45 μm and the adhesive-bonding surface thereof was corona-treated to obtain an unstretched cast film for use as the sealant layer. After that, the laminate was aged at 40° C. for 5 days, thereby producing a packaging material of Example 1-8 (laminate of base material layer/first adhesive layer/first anti-corrosion treatment layer/metal foil layer/second anti-corrosion treatment layer/second adhesive layer/sealant layer).

Comparative Examples 1-1 to 1-5

Except that the resin compositions used for forming the sealant layer were changed to (SL-1-8) to (SL-1-12) (all 30 µm thickness), packaging materials of Comparative Examples 1-1 to 1-5 were produced similarly to Example 1-1.

<Evaluations>

Evaluation tests below were conducted on the obtained packaging materials of Examples 1-1 to 1-8 and Comparative Examples 1-1 to 1-5.

(Lamination Strength of Electrolytic Solution)

An electrolytic solution was prepared by adding $LiPF_6$ to a mixed solution of ethylene carbonate/diethyl carbonate/dimethyl carbonate=1/1/1 (mass ratio) so as to be 1 M, and the electrolytic solution was filled in a Teflon (registered trademark) container. Samples each cut in a 15 mm×100 mm size were placed in the container, and the container was sealed, and stored at 85° C. for 24 hours. After that, the samples were rinsed all together, and the lamination strength (T-peel strength) was measured using a testing machine (manufactured by INSTRON, Inc.) for each sample of metal foil layer/adhesive resin interlayer or metal foil layer/second adhesive interlayer. The test was conducted in conformity with JIS K6854 at a peeling rate of 50 mm/min under an atmosphere of 23° C. and 50% RH. Based on the results, the samples were evaluated with reference to the following criteria.

A: Lamination strength exceeded 12 N/15 mm.
B: Lamination strength was 10 N/15 mm or more and 12 N/15 mm or less.
C: Lamination strength was 6 N/15 mm or more and less than 10 N/15 mm.
D: Lamination strength was less than 6 N/15 mm.

(Heat Sealing Strength of Electrolytic Solution)

Each sample was cut into a 60 mm×120 mm size and folded into two, and one edge was heat-sealed with a 10-mm-width seal bar for 3 seconds under conditions of 190° C. and 0.5 MPa. After that, two remaining edges were also heat-sealed to form a pouch, into which an electrolytic solution was injected by 1 ml, which was prepared by adding $LiPF_6$ to a mixed solution of ethylene carbonate/diethyl carbonate/dimethyl carbonate=1/1/1 (mass ratio) so as to be 1 M. The pouch was stored at 60° C. for 24 hours, and then the firstly heat-sealed edge was cut into a width of 15 mm (see FIG. 4), and the sealing strength (T-peel strength) was measured using a testing machine (manufactured by INSTRON Inc.). The test was conducted in conformity with JIS K6854 at a peeling rate of 50 mm/min under an atmosphere of 23° C. and 50% RH. Based on the results, the samples were evaluated with reference to the following criteria.

A: Sealing strength was 100 N/15 mm or more and burst width exceeded 10 mm.
B: Sealing strength was 100 N/15 mm or more and burst width was 5 to 10 mm.
C: Sealing strength was 80 N/15 mm or more and less than 100 N/15 mm.
D: Sealing strength was less than 80 N/15 mm.

(Sealed Appearance)

Figure 4:
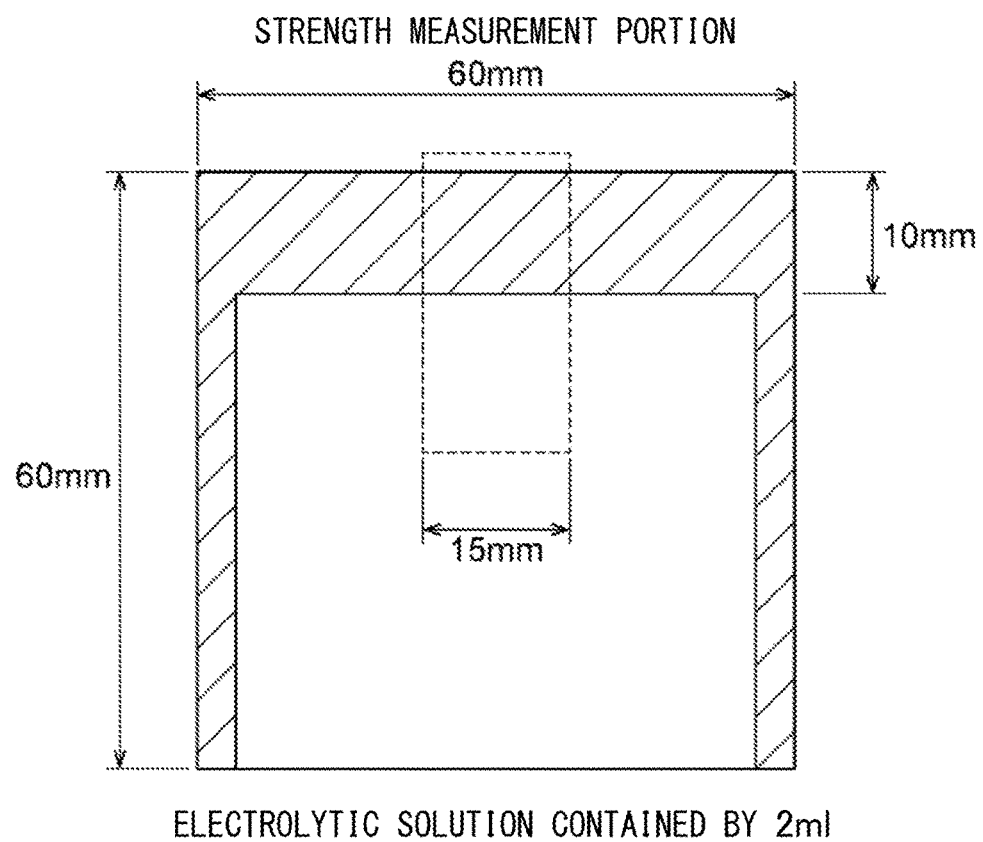
FIG. 4 is a schematic diagram illustrating a method of preparing an evaluation sample according to an example.

In the evaluation of the heat sealing strength for the above electrolytic solution, it was confirmed whether excess sealed portions were present on the inner layer sealant side, other than portions contacting the seal bar, in the portions that had been heat-sealed for 3 seconds under conditions of 190° C. and 0.5 MPa (strength measurement portions in FIG. 4). Based on the results, the samples were evaluated with reference to the following criteria. Excess sealed portions possibly decrease the thickness of the sealed portion, or possibly decrease the internal volume of the cell body, and hence the excess sealed portions are highly likely to affect battery performances and insulation properties. Thus, it is preferred that there is no excess sealed portion.

A: No excess sealed portion was found and sealed portions were uniformly formed.
D: Excess sealed portions were found.

(Degassing and Heat Sealing Strength)

Figure 5C:
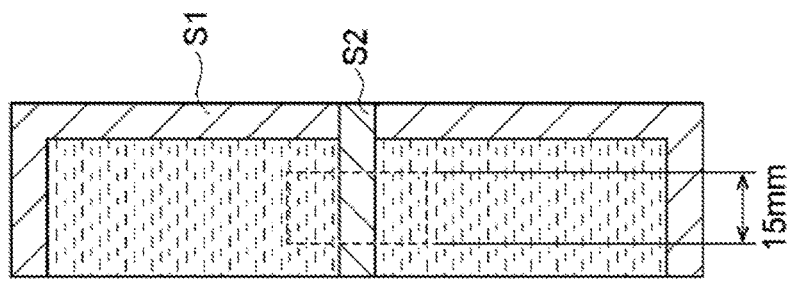
FIGS. 5A-5C are a set of schematic diagrams illustrating a method of preparing an evaluation sample according to an example.
Figure 5B:
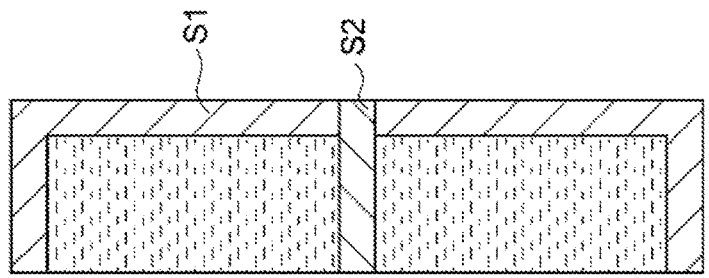
Figure 5A:
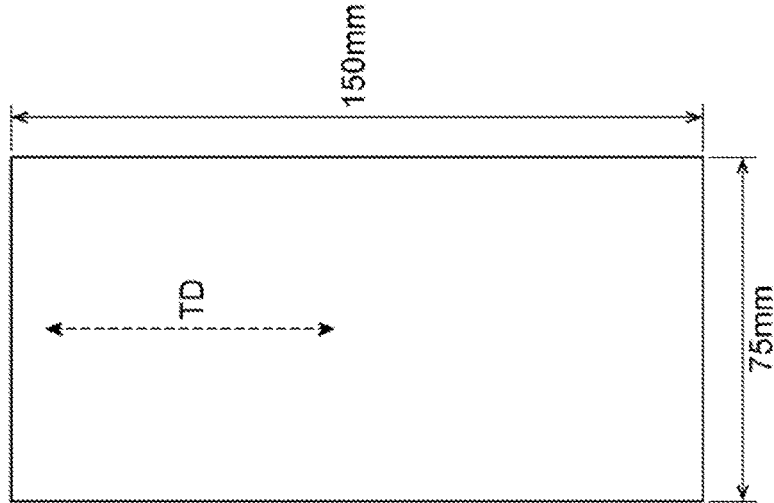

The packaging materials were each cut into a 75 mm×150 mm size and folded into two with a size of 37.5 mm×150 mm (see FIG. 5A), and then a 150-mm edge and one of 37.5-mm edged were heat-sealed to form a pouch, into which an electrolytic solution was injected by 5 ml, which was prepared by adding $LiPF_6$ to a mixed solution of ethylene carbonate/diethyl carbonate/dimethyl carbonate=1/1/1 (mass ratio) so as to be 1 M. Then, the other 37.5-mm edge was heat-sealed to obtain a pouch sealed in a sealed portion S1. Subsequently, the pouch was stored at 60° C. for 24 hours, and then the center part of the pouch was heat-sealed for 2 seconds under conditions of 190° C. and 0.3 MPa (degassing sealed portion S2, see FIG. 5B), with the electrolytic solution being contained therein. To stabilize the sealed portion, the pouch was stored at room temperature for 24 hours, and then a region including the degassing sealed portion S2 was cut into a width of 15 mm (see FIG. 5C) for measurement of the heat sealing strength (T-peel strength) using a testing machine (manufactured by INSTRON Inc.). The test was conducted in conformity with JIS K6854 at a peeling rate of 50 mm/min under an atmosphere of 23° C. and 50% RH. Based on the results, the samples were evaluated with reference to the following criteria.

A: Sealing strength was 80 N/15 mm or more.
B: Sealing strength was 60 N/15 mm or more and less than 80 N/15 mm.
C: Sealing strength was 40 N/15 mm or more and less than 60 N/15 mm.
D: Sealing strength was less than 40 N/15 mm.

(Whitening Due to Forming)

A sample of a normal packaging material and a sample stored at 60° C. for a week were each cut into a 120 mm×200 mm size, and set to a cold forming die so that the sealant layer was in contact with the projection of the forming machine, followed by 5-mm deep drawing at a forming speed of 10 mm/sec. After that, whitening observation was conducted for the film-pressing portion side edge on which the stretching was the severest. The die used had a forming area of 80 mm×70 mm (rectangular cylindrical shape) and a push corner radius (RCP) of 1.0 mm. Based on the results, the samples were evaluated with reference to the following criteria. It should be noted that, when the evaluation is C or more, it can be said that the packaging material has no practical problem.

A: Neither normal sample or the sample stored at 60° C. for a week was whitened.
B: Normal sample was not whitened, but the sample stored at 60° C. for a week was slightly whitened.
C: Normal sample was slightly whitened, and the sample stored at 60° C. for a week was whitened.
D: Normal sample was whitened.

(Overall Quality)

Evaluations on the matters set forth above are shown in Table 2. In Table 2 below, it can be said that in the absence of evaluation D, the packaging material has good overall quality.

TABLE 2

| | Sealant layer | Evaluations | | | | |
|---|---|---|---|---|---|---|
| | | Lamination strength of electrolytic solution | Heat sealing strength of electrolytic solution | Degassing and heat sealing strength | Whitening due to forming | Sealed appearance |
| Example 1-1 | SL-1-1 | A | A | A | A | A |
| Example 1-2 | SL-1-2 | A | A | A | A | A |
| Example 1-3 | SL-1-3 | B | B | B | B | A |
| Example 1-4 | SL-1-4 | B | B | A | A | A |
| Example 1-5 | SL-1-5 | A | A | B | B | A |
| Example 1-6 | SL-1-6 | A | B | B | A | A |
| Example 1-7 | SL-1-7 | B | B | B | C | A |
| Example 1-8 | SL-1-1 | A | A | A | A | A |
| Comparative Example 1-1 | SL-1-8 | B | D | D | B | A |
| Comparative Example 1-2 | SL-1-9 | A | A | A | D | A |
| Comparative Example 1-3 | SL-1-10 | A | A | A | A | D |
| Comparative Example 1-4 | SL-1-11 | C | C | D | B | A |
| Comparative Example 1-5 | SL-1-12 | C | C | D | B | A |

As is apparent from Table 2, it was confirmed that the packaging materials of Examples 1-1 to 1-8 using (SL-1-1) to (SL-1-7) as resin compositions for forming the sealant layer exerted good resistance to whitening due to forming and had good sealed appearance, and lamination strength and sealing strength (lamination strength and heat sealing strength for the electrolytic solution, and degassing and heat sealing strength) in relation to the electrolytic solution were improved. It was confirmed that, although the packaging materials of Comparative Examples 1-1, 1-4, and 1-5 exerted good resistance to whitening due to forming and had good sealed appearance, these packaging materials had poor lamination strength and sealing strength in relation to the electrolytic solution. It was confirmed that, although the packaging materials of Comparative Example 1-2 and 1-3 exerted good lamination strength and sealing strength in relation to the electrolytic solution, these packaging materials had poor resistance to whitening due to forming or poor sealed appearance.

Examples and Comparative Examples of the second aspect are set forth below.

[Materials Used]

The materials used in Examples 2-1 to 2-19 and Comparative Examples 2-1 to 2-5 are shown below.

<Base Material Layer (25 µm Thickness)>

A co-extruded multi-layer stretched film of a polyethylene terephthalate (PET) film and a nylon (Ny) film (manufactured by Gunze Limited) was used.

<First Adhesive Layer (4 µm Thickness)>

A polyurethane adhesive (manufactured by Toyo Ink Co., Ltd.) containing a polyester polyol base resin formulated using a tolylene diisocyanate adduct curing agent was used.

<First Anti-Corrosion Treatment Layer (Base Material Layer Side)>

Materials used were the same as those used for the sealant layer-side second anti-corrosion treatment layer, described later.

<Metal Foil Layer (40 µm Thickness)>

Annealed and degreased soft aluminum foil ("8079" manufactured by Toyo Aluminum K.K.) was used.

<Second Anti-Corrosion Treatment Layer (Sealant Layer Side)>

(CL-2-1): "Sodium polyphosphate-stabilized cerium oxide sol" adjusted to a solid concentration of 10 wt % using distilled water as a solvent was used. The sodium polyphosphate-stabilized cerium oxide sol was obtained by blending 10 parts by mass phosphate into 100 parts by mass cerium oxide.

(CL-2-2): Composition of 90 wt % "polyallylamine (Nitto Boseki Co., Ltd.)" and 10 wt % "polyglycerol polyglycidyl ether (Nagase Chemtex Corp.)" adjusted to a solid concentration of 5 wt % using distilled water as a solvent was used.

(CL-2-3): Chemical conversion treatment agent was used, which was prepared by adjusting concentration of chromium fluoride ($CrF_3$) to be 10 mg/m$^2$ as a Cr amount in the final dry coating film, with respect to a water-soluble phenol resin (Sumitomo Bakelite Co., Ltd.) adjusted to a solid concentration of 1 wt % using an aqueous phosphoric acid solution with a concentration of 1 mass % as a solvent.

<Adhesive Resin Layer>

The following materials were mixed at a mass ratio of AR-1:AR-2:AR-3=3:1:1 and used.

(AR-1): Acid-modified polypropylene resin composition (manufactured by Mitsui Chemicals Inc.) of a random polypropylene (PP) base formulated using ethylene-propylene rubber as an immiscible-type rubber was used.

(AR-2): Propylene-α-olefin copolymer with an atactic structure ("Tafthren H" manufactured by Sumitomo Chemical Co., Ltd.) was used.

(AR-3): Propylene-α-olefin copolymer with an isotactic structure ("Tafmer XM" manufactured by Mitsui Chemicals Inc.) was used.

<Second Adhesive Layer (3 µm Thickness)>

An adhesive prepared by blending 10 parts by mass polyisocyanate compound with an isocyanurate structure (at a solid content ratio), into 100 parts by mass maleic anhydride modified polyolefin resin dissolved in toluene was used.

<Sealant Layer>

Resin compositions (SL-2-1 to SL-2-12) prepared by mixing the components shown in Table 3 below at compounding ratios (unit:part by mass) shown in Table 3 were used. Details of the components are set forth below.

Component (A)

(Random PP): Propylene-ethylene random copolymer having a melting point of 140° C. ("Prime Polypro" manufactured by Prime Polymer Co., Ltd.)

Component (B')

(Propylene-1-butene): Propylene-1-butene random copolymer elastomer having miscibility with the component (A) and a having a melting point of 75° C. ("Tafmer XM" manufactured by Mitsui Chemicals Inc.)

(Hydrogenated styrene elastomer): Hydrogenated styrene thermoplastic elastomer having miscibility with the component (A) (manufactured by Asahi Kasei Corporation, "Tuftec")

Component (C)

(Ethylene-1-butene): Ethylene-1-butene random copolymer elastomer having no miscibility with the component (A) and having a melting point 70° C. (manufactured by Sumitomo Chemical Co., Ltd. "EXCELLEN")

(Styrene elastomer): Styrene-butadiene copolymer elastomer having no miscibility with the component (A) ("Asaflex" manufactured by Asahi Kasei Corporation)

TABLE 3

|  | Component (A) Random PP | Component (B') | | Component (C) | |
| --- | --- | --- | --- | --- | --- |
|  |  | Propylene-1-butene | Hydrogenated styrene elastomer | Ethylene-1-butene | Styrene elastomer |
| SL-2-1 | 60 | 40 | — | — | — |
| SL-2-2 | 70 | 30 | — | — | — |
| SL-2-3 | 80 | 20 | — | — | — |
| SL-2-4 | 95 | 5 | — | — | — |
| SL-2-5 | 70 | 20 | — | 10 | — |
| SL-2-6 | 80 | 10 | — | 10 | — |
| SL-2-7 | 70 | — | 20 | — | 10 |
| SL-2-8 | 70 | 10 | — | 20 | — |
| SL-2-9 | 80 | — | — | 20 | — |
| SL-2-10 | 100 | — | — | — | — |
| SL-2-11 | 80 | 10 | — | — | 10 |
| SL-2-12 | 80 | — | 10 | 10 | — |

Example 2-1

First, first and second anti-corrosion treatment layers were provided to a metal foil layer by the following procedure. That is, on both surfaces of the metal foil layer, (CL-2-1) was coated by micro gravure coating with a dry coating amount of 70 mg/m², followed by baking in a drying unit at 200° C. Subsequently, (CL-2-2) was applied to the resultant layer by micro gravure coating with a dry coating amount of 20 mg/m², thereby obtaining a composite layer of (CL-2-1) and (CL-2-2) as the first and second anti-corrosion treatment layers. This composite layer was allowed to express anti-corrosion performance by compositing two materials, i.e. by compositing (CL-2-1) with (CL-2-2).

Subsequently, a surface of the metal foil layer having the first and second anti-corrosion treatment layers, i.e. a surface on the first anti-corrosion treatment layer side, was bonded to a base material layer using a polyurethane adhesive (first adhesive layer) by dry lamination. The resultant object was set on the unwinding unit of an extrusion laminator, followed by co-extrusion of compounds onto the second anti-corrosion treatment layer under conditions of 290° C. and 100 m/min, to provide lamination in the order of an adhesive resin layer (12 μm thickness) and a sealant layer (23 μm thickness). For the adhesive resin layer and the sealant layer, compounds of various materials were prepared in advance using a twin-screw extruder, followed by water cooling and pelletization, for use in the above extrusion lamination. The resin composition (SL-2-1) was used for forming the sealant layer.

The laminate thus obtained was heat-treated by thermal lamination so that the maximum attainable temperature of the laminate would be 190° C., thereby producing a packaging material of Example 2-1 (laminate of base material layer/first adhesive layer/first anti-corrosion treatment layer/metal foil layer/second anti-corrosion treatment layer/adhesive resin layer/sealant layer).

Examples 2-2 to 2-7

Except that the resin compositions used for forming the sealant layer were changed to (SL-2-2) to (SL-2-7) (all 23 μm thickness), packaging materials of examples 2-2 to 2-7 were produced similarly to Example 2-1.

Example 2-8

Similarly to Example 2-1, a laminate of base material layer/first adhesive layer/first anti-corrosion treatment layer/metal foil layer/second anti-corrosion treatment layer was prepared. The resultant object was set on the unwinding unit of an extrusion laminator, followed by co-extrusion of compounds onto the second anti-corrosion treatment layer under conditions of 290° C. and 100 m/min, to provide lamination in the order of an adhesive resin layer (10 μm thickness), a first sealant layer (metal foil layer side, 10 μm thickness), and a second sealant layer (innermost layer, 15 μm thickness). For the adhesive resin layer, and the first and second sealant layers, compounds of various materials were prepared in advance using a twin-screw extruder, followed by water cooling and pelletization, for use in the above extrusion lamination. The resin composition (SL-2-5) was used for forming the first sealant layer, and the resin composition (SL-2-2) was used for forming the second sealant layer.

Example 2-9

Except that the resin composition used for forming the first sealant layer was changed to resin composition (SL-2-7) (10 μm thickness), a packaging material of example 2-9 was produced similarly to Example 2-8.

Example 2-10

Except that the thickness of the adhesive resin layer was changed to 10 μm and the thickness of the sealant layer was changed to 20 μm, a packaging material of Example 2-10 was produced similarly to Example 2-2.

Example 2-11

Similarly to Example 2-1, a laminate of base material layer/first adhesive layer/first anti-corrosion treatment layer/ metal foil layer/second anti-corrosion treatment layer was prepared. Subsequently, an adhesive (second adhesive layer) was applied to the second anti-corrosion treatment layer with a dry coating amount of 4 to 5 g/m² by dry lamination, followed by drying for formation of a film, and then the sealant layer was bonded thereto. An unstretched cast film was used as the sealant layer which was prepared by forming a film with a thickness of 30 μm using the resin composition (SL-2-2), followed by corona-treating the adhesive-bonding surface. After that, the laminate was aged at 40° C. for 5 days, thereby producing a packaging material of Example 2-11 (laminate of base material layer/first adhesive layer/first anti-corrosion treatment layer/metal foil layer/second anti-corrosion treatment layer/second adhesive layer/sealant layer).

Example 2-12

Except that the first and second anti-corrosion treatment layers were prepared by the following procedure, a packaging material of example 2-12 was produced similarly to Example 2-2. In example 2-12, resin composition (CL-2-3) was applied to both surfaces of the metal foil layer by micro gravure coating with a dry coating amount of 30 mg/m², followed by baking in a drying unit at 200° C. Subsequently, the composition (CL-2-2) was applied to the resultant layer by micro gravure coating with a dry coating amount of 20 mg/m², thereby forming a composite layer of (CL-2-3) and (CL-2-2) as the first and second anti-corrosion treatment layers. This composite layer was allowed to express anti-corrosion performance by compositing two materials, i.e. by compositing (CL-2-3) with (CL-2-2).

Example 2-13

Except that the first and second anti-corrosion treatment layers were prepared by the following procedure, a packaging material of example 2-13 was produced similarly to Example 2-11. In example 2-13, (CL-2-3) was applied to both surfaces of the metal foil layer by micro gravure coating with a dry coating amount of 30 mg/m², followed by baking in a drying unit at 200° C. Subsequently, composition (CL-2-2) was applied to the resultant layer by micro gravure coating with a dry coating amount of 20 mg/m², thereby forming a composite layer of (CL-2-3) and (CL-2-2) as the first and second anti-corrosion treatment layers. This composite layer was allowed to express anti-corrosion performance by compositing two materials, i.e. by compositing (CL-2-3) with (CL-2-2).

Example 2-14

Except that the thickness of the adhesive resin layer was changed to 13 μm and the thickness of the sealant layer was changed to 27 μm, a packaging material of example 2-14 was produced similarly to Example 2-2.

Example 2-15

Except that the thickness of the adhesive resin layer was changed to 13 μm and the thickness of the sealant layer was changed to 27 μm, a packaging material of example 2-15 was produced similarly to Example 2-5.

Example 2-16

Except that the thickness of the adhesive resin layer was changed to 15 μm and the thickness of the sealant layer was changed to 30 μm, a packaging material of example 2-16 was produced similarly to Example 2-2.

Example 2-17

Except that the thickness of the adhesive resin layer was changed to 15 μm and the thickness of the sealant layer was changed to 30 μm, a packaging material of example 2-17 was produced similarly to example 2-5.

Example 2-18

Except that the thickness of the adhesive resin layer was changed to 27 μm and the thickness of the sealant layer was changed to 53 μm, a packaging material of example 2-18 was produced similarly to Example 2-2.

Example 2-19

Except that the thickness of the adhesive resin layer was changed to 27 μm and the thickness of the sealant layer was changed to 53 μm, a packaging material of example 2-19 was produced similarly to Example 2-5.

Comparative Examples 2-1 to 2-5

Except that the resin compositions used for forming the sealant layer were changed to (SL-2-8) to (SL-2-12) (both 23 μm thickness), packaging materials of comparative examples 2-1 to 2-5 were produced similarly to Example 2-1.

<Evaluations>

Evaluation tests below were conducted on the obtained packaging materials of Examples 2-1 to 2-19 and Comparative Examples 2-1 to 2-5.

(Lamination Strength of Electrolytic Solution)

An electrolytic solution was prepared by adding $LiPF_6$ to a solution of ethylene carbonate/diethyl carbonate/dimethyl carbonate=1/1/1 so as to be 1 M. The electrolytic solution was filled in a Teflon (registered trademark) container, in which samples of the packaging materials each cut into a 15 mm×100 mm size were placed, and the container was sealed and stored at 85° C. for 24 hours. After that, the sample was rinsed all together, and the lamination strength (T-peel strength) of each sample of metal foil layer/adhesive resin interlayer or metal foil layer/second adhesive interlayer was measured using a testing machine (manufactured by INSTRON, Inc.). The test was conducted in conformity with JIS K6854 at a peeling rate of 50 mm/min under an atmosphere of 23° C. and 50% RH. Based on the results, the samples were evaluated with reference to the following criteria.

A: Lamination strength exceeded 9 N/15 mm.
B: Lamination strength was 7 N/15 mm or more and 9 N/15 mm or less.
C: Lamination strength was 5 N/15 mm or more and less than 7 N/15 mm.
D: Lamination strength was less than 5 N/15 mm.

(Heat Sealing Strength of Electrolytic Solution)

Each sample cut into a 60 mm×120 mm size was folded into two, and one edge was heat-sealed for 3 seconds with a 10-mm-width seal bar under conditions of 190° C. and 0.5 MPa.

After that, the two remaining edges were also heat-sealed to form a pouch, into which an electrolytic solution was injected by 2 ml, which had been prepared by adding $LiPF_6$ to a mixed solution of ethylene carbonate/diethyl carbonate/ dimethyl carbonate=1/1/1 (mass ratio) so as to be 1 M. The resulting pouch was stored at 60° C. for 24 hours, and then the firstly heat-sealed edge was cut into a width of 15 mm (see FIG. 4), for measurement of the sealing strength (T-peel strength) using a testing machine (manufactured by INSTRON Inc.). The test was conducted in conformity with JIS K6854 at a peeling rate of 50 mm/min under an atmosphere of 23° C. and 50% RH. Based on the results, the samples were evaluated with reference to the following criteria.

A: Sealing strength was 80 N/15 mm or more and burst width exceeded 5 mm.

B: Sealing strength was 80 N/15 mm or more and burst width was 3 to 5 mm.

C: Sealing strength was 60 N/15 mm or more and less than 80 N/15 mm.

D: Sealing strength was less than 60 N/15 mm.

(Degassing and Heat Sealing Strength)

Each packaging material was cut into a 75 mm×150 mm size and folded into two with a size of 37.5 mm×150 mm (see FIG. 5A), followed by heat sealing a 150-mm edge and one of 37.5-mm edges, to form a pouch, into which an electrolytic solution was injected by 5 ml, which had been prepared by adding LiPF$_6$ to a mixed solution of ethylene carbonate/diethyl carbonate/dimethyl carbonate=1/1/1 (mass ratio) so as to be 1 M, followed by heat sealing the other 37.5-mm edge, thereby obtaining a pouch sealed in a sealed portion S1. Subsequently, the pouch was stored at 60° C. for 24 hours, and then the center part of the pouch was heat-sealed for 2 seconds under conditions of 190° C. and 0.3 MPa (degassing sealed portion S2, see FIG. 5B), with the electrolytic solution being contained therein. To stabilize the sealed portion, the pouch was stored at room temperature for 24 hours, and then a region including the degassing sealed portion S2 was cut into a width of 15 mm (see FIG. 5C), for measurement of the heat sealing strength (T-peel strength) using a testing machine (manufactured by INSTRON Inc.). The test was conducted in conformity with JIS K6854 at a peeling rate of 50 mm/min under an atmosphere of 23° C. and 50% RH. Based on the results, the samples were evaluated with reference to the following criteria.

A: Sealing strength was 60 N/15 mm or more.

B: Sealing strength was 40 N/15 mm or more and less than 60 N/15 mm.

C: Sealing strength was 30 N/15 mm or more and less than 40 N/15 mm.

D: Sealing strength was less than 30 N/15 mm.

(Insulation Properties after Forming)

Figure 6A:
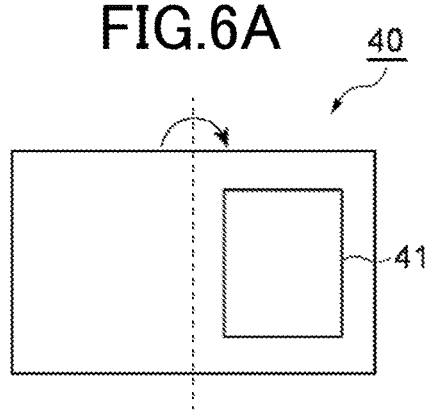
FIGS. 6A-6F are a set of schematic diagrams illustrating a method of preparing an evaluation sample according to an example.
Figure 6D:
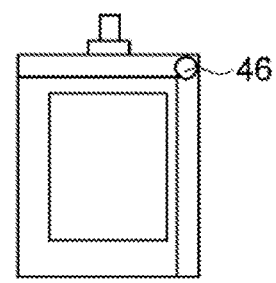
Figure 6B:
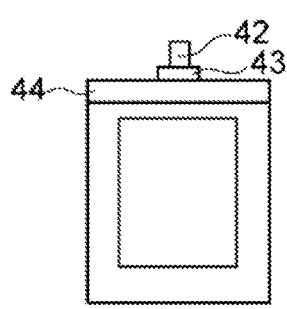
Figure 6E:
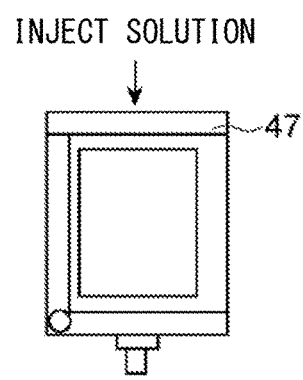
Figure 6C:
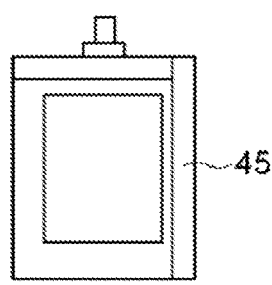
Figure 6F:
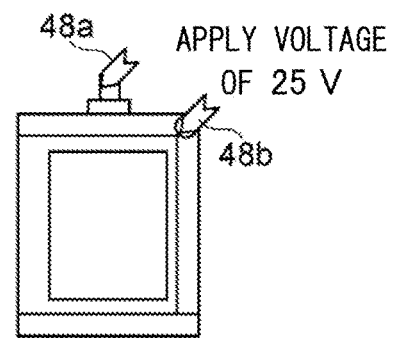

A sample 40 of A packaging material cut into a 120 mm×200 mm size was set on a cold forming die so that the sealant layer was in contact with the projection of the forming machine, followed by 2.5-mm deep drawing at a forming speed of 15 mm/sec to form a deep-drawn portion 41, and then the sample 40 was folded into two each having a size of 120 mm×100 mm (see FIG. 6A). Subsequently, an upper edge portion 44 with a length of 100 mm was heat-sealed with a tab 42 and a tab sealant 43 being sandwiched therebetween (see FIG. 6B), followed by heat sealing side edge portions 45 each having a length of 120 mm to form a pouch (see FIG. 6C). After that, for contact of an electrode, a part of the outer layer of the sample 40 was cut to form an exposed portion 46 from which the metal foil layer was exposed (see FIG. 6D). Subsequently, an electrolytic solution was injected by 5 ml into the pouch, which had been prepared by adding LiPF$_6$ to a mixed solution of ethylene carbonate/diethyl carbonate/dimethyl carbonate=1/1/1 (mass ratio) so as to be 1 M, and a lower edge portion 47 with a length of 100 mm was heat-sealed (see FIG. 6E). After that, electrodes 48a and 48b were respectively connected to the tab 42 and the exposed portion 46 from which the metal foil layer was exposed, followed by application of a voltage 25 V using a withstand voltage insulation resistance tester ("TOS9201" manufactured by KIKUSUI ELECTRONIC CORP.), and the resistance then was measured (see FIG. 6F). The die used had a forming area of 80 mm×70 mm (rectangular cylindrical shape) and a push corner radius (RCP) of 1.0 mm. Based on the results, the samples were evaluated with reference to the following criteria.

A: Resistance exceeded 200 MΩ.

B: Resistance was 100 MΩ or more 200 MΩ or less.

C: Resistance was 30 MΩ or more and less than 100 MΩ.

D: Resistance was less than 30 MΩ.

(Overall Quality)

Evaluations on the matters set forth above are shown in Table 4. In Table 4 below, it can be said that in the absence of evaluation D, the packaging material has good overall quality.

TABLE 4

| | Anti-corrosion treatment layer | Adhesive resin layer or 2nd adhesive layer | Sealant layer | | Total thickness of adhesive resin layer or 2nd adhesive layer and sealant layer [μm] | Evaluation result | | | |
|---|---|---|---|---|---|---|---|---|---|
| | | | Metal foil layer side | Innermost layer | | Lamination strength of electrolytic solution | Heat sealing strength of electrolytic solution | Degassing and heat sealing strength | Insulation properties after forming |
| Ex. 2-1 | Ceria treatment | Adhesive resin layer | — | SL-2-1 | 35 | A | B | B | A |
| Ex. 2-2 | Ceria treatment | Adhesive resin layer | — | SL-2-2 | 35 | A | B | B | A |
| Ex. 2-3 | Ceria treatment | Adhesive resin layer | — | SL-2-3 | 35 | A | B | B | A |
| Ex. 2-4 | Ceria treatment | Adhesive resin layer | — | SL-2-4 | 35 | A | B | B | A |
| Ex. 2-5 | Ceria treatment | Adhesive resin layer | — | SL-2-5 | 35 | A | A | A | B |
| Ex. 2-6 | Ceria treatment | Adhesive resin layer | — | SL-2-6 | 35 | A | A | A | B |
| Ex. 2-7 | Ceria treatment | Adhesive resin layer | — | SL-2-7 | 35 | B | B | C | C |

TABLE 4-continued

|  | Anti-corrosion treatment layer | Adhesive resin layer or 2nd adhesive layer | Sealant layer | | Total thickness of adhesive resin layer or 2nd adhesive layer and sealant layer [μm] | Evaluation result | | | |
|---|---|---|---|---|---|---|---|---|---|
|  |  |  | Metal foil layer side | Innermost layer |  | Lamination strength of electrolytic solution | Heat sealing strength of electrolytic solution | Degassing and heat sealing strength | Insulation properties after forming |
| Ex. 2-8 | Ceria treatment | Adhesive resin layer | SL-2-5 | SL-2-2 | 35 | A | A | A | A |
| Ex. 2-9 | Ceria treatment | Adhesive resin layer | SL-2-7 | SL-2-2 | 35 | B | B | B | A |
| Ex. 2-10 | Ceria treatment | Adhesive resin layer | — | SL-2-2 | 30 | A | B | B | A |
| Ex. 2-11 | Ceria treatment | 2nd adhesive layer | — | SL-2-2 | 33 | A | B | B | A |
| Ex. 2-12 | Chemical conversion treatment | Adhesive resin layer | — | SL-2-2 | 35 | A | B | B | A |
| Ex. 2-13 | Chemical conversion treatment | 2nd adhesive layer | — | SL-2-2 | 33 | A | B | B | A |
| Ex. 2-14 | Ceria treatment | Adhesive resin layer | — | SL-2-2 | 40 | A | A | A | A |
| Ex. 2-15 | Ceria treatment | Adhesive resin layer | — | SL-2-5 | 40 | A | A | A | A |
| Ex. 2-16 | Ceria treatment | Adhesive resin layer | — | SL-2-2 | 45 | A | A | A | A |
| Ex. 2-17 | Ceria treatment | Adhesive resin layer | — | SL-2-5 | 45 | A | A | A | A |
| Ex. 2-18 | Ceria treatment | Adhesive resin layer | — | SL-2-2 | 80 | A | A | A | A |
| Ex. 2-19 | Ceria treatment | Adhesive resin layer | — | SL-2-5 | 80 | A | A | A | A |
| Comp. Ex. 2-1 | Ceria treatment | Adhesive resin layer | — | SL-2-8 | 35 | A | A | B | D |
| Comp. Ex. 2-2 | Ceria treatment | Adhesive resin layer | — | SL-2-9 | 35 | A | A | B | D |
| Comp. Ex. 2-3 | Ceria treatment | Adhesive resin layer | — | SL-2-10 | 35 | C | C | D | C |
| Comp. Ex. 2-4 | Ceria treatment | Adhesive resin layer | — | SL-2-11 | 35 | B | B | C | D |
| Comp. Ex. 2-5 | Ceria treatment | Adhesive resin layer | — | SL-2-12 | 35 | B | B | C | D |

As is apparent from Table 4, it was confirmed that the packaging materials of Examples 2-1 to 2-19 using (SL-2-1) to (SL-2-7) as resin compositions for forming the sealant layer exhibited good insulation properties after forming and good lamination strength and sealing strength (lamination strength for electrolytic solution, heat sealing strength for electrolytic solution, and degassing and heat sealing strength) in relation to the electrolytic solution. It was confirmed that, although the packaging materials of Comparative Examples 2-1, 2-2, 2-4, and 2-5 exhibited good lamination strength and sealing strength in relation to the electrolytic solution, these packaging materials had poor insulation properties after forming. It was confirmed that, although the packaging material of Comparative Example 2-3 exhibited good insulation properties after forming, the packaging material exhibited low degassing and heat sealing strength.

REFERENCE SIGNS LIST 10, 20, 30 . . . Packaging material for a power storage device
11 . . . Base material layer
12 . . . First adhesive layer
13 . . . Metal foil layer
14 . . . Anti-corrosion treatment layer
15 . . . Adhesive resin layer
16 . . . Sealant layer
16a . . . First sealant layer
16b . . . Second sealant layer
17 . . . Second adhesive layer
40 . . . Sample
41 . . . Deep drawn portion
42 . . . Tab
43 . . . Tab sealant
44 . . . Upper edge portion
45 . . . Edge portion
46 . . . Exposed portion of metal foil layer
47 . . . Lower edge portion
48a, 48b . . . Electrode
S1 . . . Sealed portion
S2 . . . Degassing sealed portion

What is claimed is:
1. A packaging material for a power storage device, comprising the following structure in the following order:
a base material layer,
a first adhesive layer,
metal foil layer provided with an anti-corrosion treatment layer on one surface or both surfaces thereof,
a second adhesive layer or an adhesive resin layer, and,
a sealant layer, wherein the sealant layer includes a layer formed of a resin composition that contains 60 to 95 mass % propylene-ethylene random copolymer (A), and 5 to 40 mass % polyolefin elastomer (B) with a melting point of 150° C. or less including 1-butene as a comonomer.

2. The packaging material for a power storage device of claim 1, wherein the polyolefin elastomer (B) includes a polyolefin elastomer (B-1) miscible with the propylene-ethylene random copolymer (A), and a polyolefin elastomer (B-2) immiscible with the propylene-ethylene random copolymer (A).

3. The packaging material for a power storage device of claim 2, wherein the miscible-type polyolefin elastomer (B-1) is a propylene-1-butene random copolymer, and the immiscible-type polyolefin elastomer (B-2) is an ethylene-1-butene random copolymer.

4. The packaging material for a power storage device of claim 1, wherein:
the metal foil layer is laminated with the sealant layer via the adhesive resin layer; and,
the adhesive resin layer contains modified polypropylene as an adhesive resin composition.

5. The packaging material for a power storage device of claim 1, wherein:
the metal foil layer is laminated with the sealant layer via the adhesive resin layer; and
the adhesive resin layer contains an adhesive resin composition and polypropylene with an atactic structure and/or propylene-α-olefin copolymer with an atactic structure.

6. The packaging material for a power storage device of claim 5, wherein the adhesive resin layer further contains propylene-α-olefin copolymer with an isotactic structure.

7. The packaging material for a power storage device of claim 1, wherein:
the anti-corrosion treatment layer is provided to at least a sealant layer side surface of the metal foil layer, the anti-corrosion treatment layer containing at least one polymer selected from a group consisting of cationic polymers and anionic polymers;
the metal foil layer is laminated with the sealant layer via the second adhesive layer; and
the second adhesive layer contains a compound having reactivity with the polymer contained in the anti-corrosion treatment layer in contact with the second adhesive layer.

8. The packaging material for a power storage device of claim 7, wherein the second adhesive layer contains an acid-modified polyolefin resin.

9. The packaging material for a power storage device of claim 1, wherein the anti-corrosion treatment layer contains a rare earth element oxide, and 1 to 100 parts by mass phosphoric acid or phosphate relative to 100 parts by mass of the rare earth element oxide.

10. A packaging material for a power storage device, comprising the structure in the following order:
a base material layer,
a first adhesive layer,
a metal foil layer provided with an anti-corrosion treatment layer on one surface or both surfaces thereof,
a second adhesive layer or an adhesive resin layer, and,
a sealant layer, wherein:
the sealant layer includes a layer formed of a resin composition containing 60 to 95 mass % propylene-ethylene random copolymer (A), and total of 5 to 40 mass % elastomer (B') miscible with the propylene-ethylene random copolymer (A) and/or an elastomer (C) immiscible with the propylene-ethylene random copolymer (A);
in the resin composition, a content of the immiscible-type elastomer (C) relative to a content of the miscible-type elastomer (B') in terms of a mass ratio is in a range of 0 to 1; and
the elastomer miscible-type (B') and the immiscible-type elastomer (C) have a common comonomer component.

11. The packaging material for a power storage device of claim 10, wherein the miscible-type elastomer (B') is a propylene-1-butene random copolymer, and the immiscible-type elastomer (C) is an ethylene-1-butene random copolymer.

12. The packaging material for a power storage device of claim 10, wherein the miscible-type elastomer (B') is a hydrogenated styrene elastomer, and the immiscible-type elastomer (C) is a styrene elastomer.

13. The packaging material for a power storage device of claim 10, wherein:
the sealant layer is formed as a multi-layer; and
among multiple layers forming the sealant layer, a layer using, as a main surface, a surface of the sealant layer on a side opposite to the second adhesive layer or the adhesive resin layer is formed of a resin composition containing the propylene-ethylene random copolymer (A) but containing neither the miscible-type elastomer (B') nor the immiscible-type elastomer (C), or is formed of a resin composition containing the propylene-ethylene random copolymer (A) and the miscible-type elastomer (B') but not containing the immiscible-type elastomer (C).

14. The packaging material for a power storage device of claim 10, wherein:
the metal foil layer is laminated with the sealant layer via the adhesive resin layer; and
the adhesive resin layer contains an adhesive resin composition, and polypropylene with an atactic structure and/or a propylene-α-olefin copolymer with an atactic structure.

15. The packaging material for a power storage device of claim 10, wherein
the metal foil layer is laminated with the sealant layer via the second adhesive layer; and
the second adhesive layer contains an acid-modified polyolefin resin, and at least one compound selected from a group consisting of a polyfunctional isocyanate compound, a glycidyl compound, a compound having a carboxy group, and a compound having an oxazoline group.

16. The packaging material for a power storage device of claim 10, wherein the anti-corrosion treatment layer contains ceric oxide, 1 to 100 parts by mass phosphoric acid or phosphate relative to 100 parts by mass of the ceric oxide, and a cationic polymer.

17. The packaging material for a power storage device of claim 10, wherein the anti-corrosion treatment layer is formed by applying chemical conversion treatment to the metal foil layer, and the anti-corrosion treatment layer contains a cationic polymer.

* * * * *